(12) United States Patent
Yamada

(10) Patent No.: US 7,615,768 B2
(45) Date of Patent: Nov. 10, 2009

(54) DOCUMENT ORIGINAL SIZE DETECTING DEVICE

(75) Inventor: Takanori Yamada, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 101 days.

(21) Appl. No.: 11/834,749

(22) Filed: Aug. 7, 2007

(65) Prior Publication Data

US 2008/0181624 A1     Jul. 31, 2008

(30) Foreign Application Priority Data

Aug. 8, 2006  (JP) .............................. 2006-215935

(51) Int. Cl.
*H04N 1/00*      (2006.01)
*G03G 15/00*    (2006.01)

(52) U.S. Cl. .............................. 250/559.36; 250/559.4; 358/488; 358/449; 399/370

(58) Field of Classification Search ............ 250/559.36, 250/559.4; 358/488, 449; 399/16, 17, 370
See application file for complete search history.

(56) References Cited

U.S. PATENT DOCUMENTS

| | | | |
|---|---|---|---|
| 4,511,246 A * | 4/1985 | Nishiyama | .................... 355/75 |
| 4,568,181 A * | 2/1986 | Nishiyama | .................... 355/75 |
| 4,614,874 A | 9/1986 | Fukuda et al. | |
| 4,659,214 A * | 4/1987 | Takemura et al. | .............. 355/75 |
| 4,713,550 A * | 12/1987 | Anzai et al. | ............... 250/559.2 |
| 4,939,377 A * | 7/1990 | Okuda et al. | ........... 250/559.15 |
| 4,954,846 A * | 9/1990 | Matsuo et al. | ................. 399/51 |
| 5,519,483 A * | 5/1996 | Kawanishi et al. | ............ 399/45 |
| 5,693,933 A * | 12/1997 | Takasu et al. | ............ 250/208.1 |

FOREIGN PATENT DOCUMENTS

| | | |
|---|---|---|
| JP | 5-14260 | 2/1993 |
| JP | 06-130503 | 5/1994 |

* cited by examiner

*Primary Examiner*—Thanh X Luu
*Assistant Examiner*—Tony Ko
(74) *Attorney, Agent, or Firm*—Renner, Otto, Boisselle & Sklar, LLP

(57) ABSTRACT

A document original size detecting device has a plurality of sensors each including a light emitting portion and a light receiving portion and respectively disposed as corresponding to different sizes of document originals to be placed on a transparent document platen and a detecting section which determines a document original size based on outputs of the sensors. The light emitting portion of each of the sensors emits light to illuminate at least two positions on a document placing region of the document platen on which a document original to be subjected to size detection is placed, and the detecting section determines the document original size based on whether or not the light receiving portion of each of the sensors detects the document original blocking the light in at least one of the two positions.

10 Claims, 24 Drawing Sheets

DOCUMENT ORIGINAL SIZE DETECTING DEVICE

CROSS-REFERENCE TO RELATED APPLICATIONS

This application is related to Japanese patent application No. 2006-215935 filed on Aug. 8, 2006, whose priority is claimed under 35 USC §119, the disclosure of which is incorporated by reference in its entirety.

BACKGROUND OF THE INVENTION

1. Field of the Invention

The present invention relates to a document original size detecting device and, particularly, to a device which detects the size of a document original in an electrophotographic copying machine.

2. Description of the Related Art

A document original size detecting device of the prior art generally includes an openable document original cover which covers a document original placed on a transparent document platen provided on the top of a copying machine main body, a plurality of sensors each including a light emitting element and a light receiving element and disposed below the document platen as respectively corresponding to different sizes of document originals to be placed on the document platen, light path establishing means which establishes a light path for guiding a light beam emitted from the light emitting element through the document platen to the corresponding light receiving element by reflection with the document original cover being opened at an angle within a predetermined angular range, driving means which drives each adjacent pair of sensors in a time staggered manner, and size determining means which determines a document original size on the basis of whether or not the light beam is received on the light receiving element of each of the sensors driven in the time staggered manner (see, for example, Japanese Examined Patent Publication No. HEI5(1993)-14260).

However, if the document original has a missing portion such as a punch hole, there is a possibility that the light beam from the light emitting element passes through the missing portion to reach the light receiving element. As a result, the document original size detecting device of the prior art suffers from erroneous detection of the document original size.

SUMMARY OF THE INVENTION

In view of the foregoing, the present invention is directed to a document original size detecting device which is free from the erroneous detection of the document original size even if the document original has a missing portion such as a punch hole.

According to the present invention, there is provided a document original size detecting device, which includes a plurality of sensors each including a light emitting portion and a light receiving portion and respectively disposed as corresponding to different sizes of document originals to be placed on a transparent document platen, and a detecting section which determines a document original size based on outputs of the sensors, wherein the light emitting portion of each of the sensors emits light to illuminate at least two positions on a document placing region of the document platen on which a document original to be subjected to size detection is placed, and the detecting section determines the document original size based on whether or not the light receiving portion of each of the sensors detects the document original blocking the light in at least one of the two positions.

DETAILED DESCRIPTION OF THE INVENTION

Figure 1:
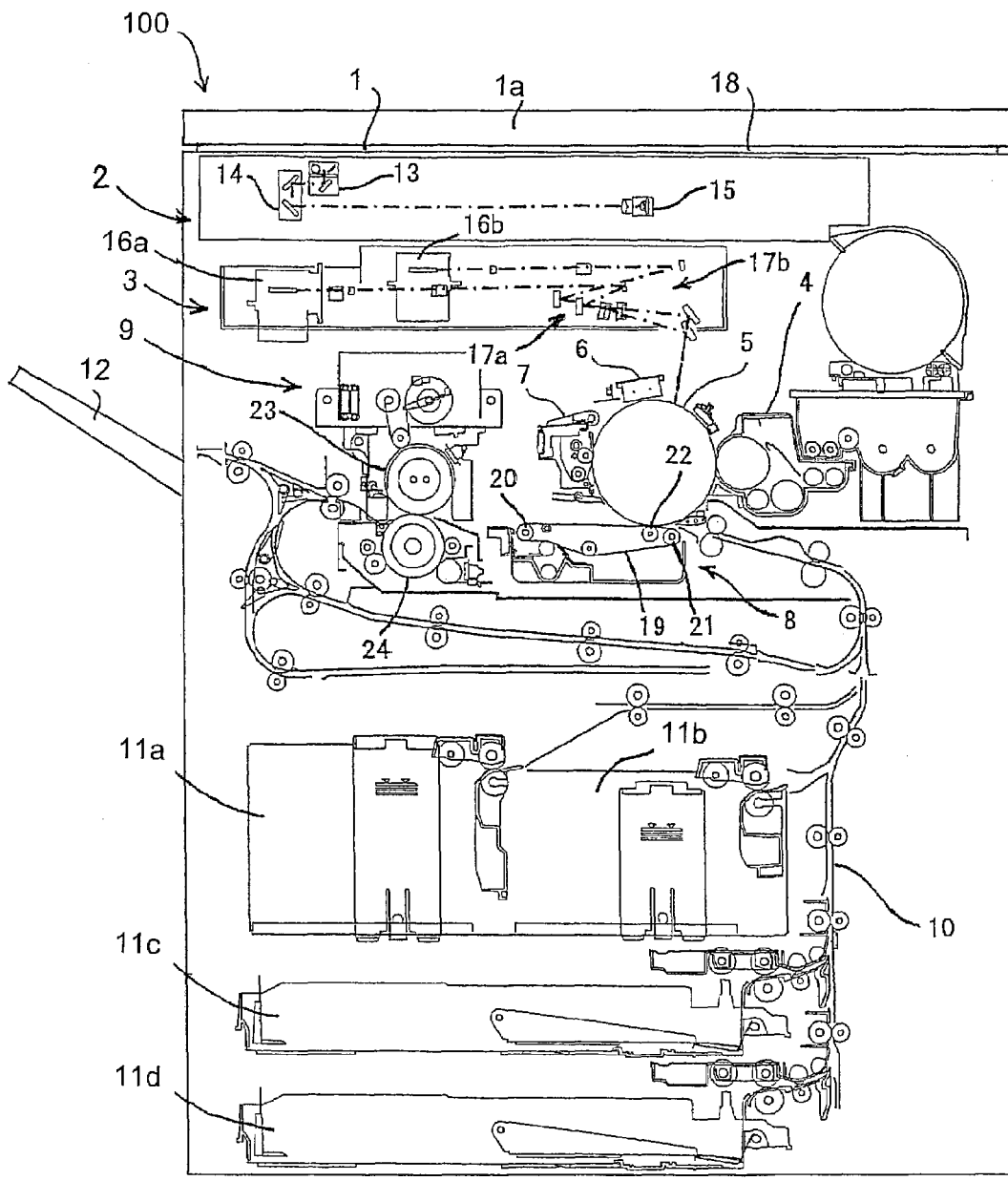
FIG. 1 is an explanatory diagram showing the construction of an image forming apparatus according to the present invention.

In accordance with the present invention, the light emitting portion of each of the sensors may include at least two light emitting elements, and the light receiving portion of each of the sensors may include at least one light receiving element which receives light beams emitted from the light emitting elements.

The light emitting elements of each of the sensors are preferably arranged so that the at least two positions on the document placing region are aligned parallel to a reference line along which one edge of the document original is positioned on the document platen.

The light emitting portion of each of the sensors may include a light emitting element which emits a light beam on the document platen, and an illumination position moving section which moves an illumination position at which the light beam emitted from the light emitting element is incident on the document platen to the at least two positions, the at least two positions being aligned parallel to a reference line along which one edge of the document original is positioned on the document platen, and the light receiving portion of each of the sensors may include a light receiving element which receives the light beam emitted from the light emitting element.

The light emitting portion of each of the sensors may include a light emitting element and an illumination position moving section which moves an illumination position at which a light beam emitted from the light emitting element is incident on the document platen to the at least two positions, the at least two positions being aligned parallel to a reference line along which one edge of the document original is positioned on the document platen, and the light receiving portion of each of the sensors may include a light receiving element and a light receiving element moving section which moves the light receiving element according to movement of the illumination position on the document platen.

The illumination position moving section may include a movement mechanism which moves the light emitting element by resilient means.

The illumination position moving section may include a mirror which reflects the light beam emitted from the light emitting element, and a movement mechanism which moves the mirror by resilient means.

The illumination position moving section may include a mirror which reflects the light beam emitted from the light emitting element, and a movement mechanism which moves the mirror by driving means.

The illumination position moving section may include a first movement mechanism which moves the light emitting element by driving means, and the light receiving element moving section may include a second movement mechanism which moves the light receiving element by driving means.

The illumination position moving section may include a first board mounted with the light emitting element and a first movement mechanism which moves the first board by driving means, and the light receiving element moving section may include a second board mounted with the light receiving element and a second movement mechanism which moves the second board by driving means.

Here, examples of the driving means include an electric motor and an air cylinder.

A distance L between the at least two positions may be defined by the following expression:

$$na+(n-1)b < L < na+nb$$

wherein a is the diameter of each of punch holes formed in the document original, b is a distance between each adjacent pair of punch holes, and n is a given natural number.

According to the present invention, the sensors are respectively disposed as corresponding to the different sizes of document originals to be placed on the document platen, and the light emitting portion of each of the sensors emits light to illuminate the at least two positions on the document platen. The document original size is determined based on whether or not the light receiving portion detects the document original blocking the light in at least one of the at least two positions on the document platen. Therefore, even if the document original has missing portions such as punch holes, the light is blocked by a portion of the document original other than the missing portions. Thus, the document original size is accurately determined.

FIG. 1 is an explanatory diagram illustrating an image forming apparatus (e.g., an electrophotographic copying machine) which employs a document original size detecting device according to the present invention.

The image forming apparatus 100 is adapted to form a monochrome image on a predetermined recording sheet according to image data obtained by scanning a document original placed on a document platen 1 of transparent glass.

The image forming apparatus 100 principally includes the document platen 1, a document original cover 1a, an image reading section 2, an optical writing unit 3, a developing unit 4, a photoreceptor 5, an electrifier 6, a cleaner unit 7, a transfer unit 8, a fixing unit 9, a sheet transport path 10, sheet feeding trays 11a to 11d and a sheet ejection tray 12.

The image reading section 2 principally includes a light source holder 13, mirrors 14 and a CCD 15. When a document original is placed on the document platen 1 and covered with the document original cover 1a, the document original is scanned with light emitted from a light source of the light source holder 13, and light reflected from the document original is deflected by the mirrors 14 to be focused on the CCD 15, and converted into electronic image data.

The electrifier 6 is electrical charging means for uniformly electrically charging a surface of the photoreceptor 5 at a predetermined potential. Here, a charger-type electrifier is employed as the electrifier 6, but a roller or brush electrifier of a contact type may be used.

Here, a laser scanning unit (LSU) including laser emitting sections 16a, 16b and mirror sets 17a, 17b is employed as the optical writing unit 3, but an EL writing head or an LED writing head including light emitting elements arranged in an array may be used.

The optical writing unit 3 is of a dual beam system, which includes the two laser emitting sections 16a, 16b for a higher speed printing process. Thus, a load associated with high speed illumination is alleviated.

The surface of the photoreceptor 5 uniformly charged by the electrifier 6 is exposed to laser beams applied thereto from the laser emitting sections 16a, 16b according to the inputted image data via the mirror sets 17a, 17b, whereby an electrostatic latent image is formed on the surface of the photoreceptor 5 according to the image data.

The developing unit 4, which is disposed adjacent the photoreceptor 5, develops the electrostatic latent image formed on the surface of the photoreceptor 5 into a toner image with black toner.

The cleaner unit 7, which is disposed adjacent the photoreceptor 5, removes toner remaining on the surface of the photoreceptor 5 after the development and image transfer, and recovers the removed toner.

The image forming apparatus 100 further includes a control section (not shown) which controls the overall operation of the image forming apparatus 100.

The control section includes a CPU, a ROM which stores control programs to be executed by the CPU, a RAM which provides a work area to the CPU, a nonvolatile memory which retains control data, an input circuit to which signals are inputted from detection means of the image forming apparatus 100, a driver circuit which drives actuators and motors for actuating drive mechanisms of the image forming apparatus 100, and an output circuit which drives the laser emitting sections 16a, 16b.

The toner image formed on the surface of the photoreceptor 5 by developing the electrostatic latent image in the aforesaid manner is transferred onto a recording sheet transported to the transfer unit 8 by applying an electric field having a polarity opposite to that of the charges of the toner image to the sheet from the transfer unit 8.

Where the toner image has a negative polarity, for example, the electric field applied by the transfer unit 8 has a positive polarity.

A transfer belt 19 of the transfer unit 8 is stretched around a driving roller 20, a driven roller 21 and other rollers, and has a predetermined resistivity (e.g., $1 \times 10^9$ to $1 \times 10^{13}$ Ω·cm).

An electrically conductive elastic roller 22 capable of applying the transfer electric field is disposed at a contact between the photoreceptor 5 and the transfer belt 19.

The recording sheet with the toner image (unfixed toner) transferred thereon by the transfer unit 8 is transported through the fixing unit 9, whereby the toner image is melted and fixed on the recording sheet.

The fixing unit 9 includes a heat roller 23 and a press roller 24. The heat roller 23 includes a heat source provided on an inner peripheral surface thereof for keeping the surface of the heat roller 23 at a predetermined temperature (a fixing temperature of about 160° C. to about 200° C.).

On the other hand, the press roller 24 includes press members (not shown) provided on opposite ends thereof for pressing the press roller 24 against the heat roller 23 at a predetermined pressure.

Thus, the unfixed toner on the transported recording sheet is heated to be melted by the heat roller 23 in a press contact portion (a so-called fixing nip) between the heat roller 23 and the press roller 24, and pressed against the recording sheet to be fixed on the recording sheet in the press contact portion.

The plurality of sheet feeding trays 11a to 11d which respectively store recording sheets of B5, A4, B4 and A3 sizes to be used for image formation are provided in a lower portion of the image forming apparatus 100.

First Embodiment

Figure 2:
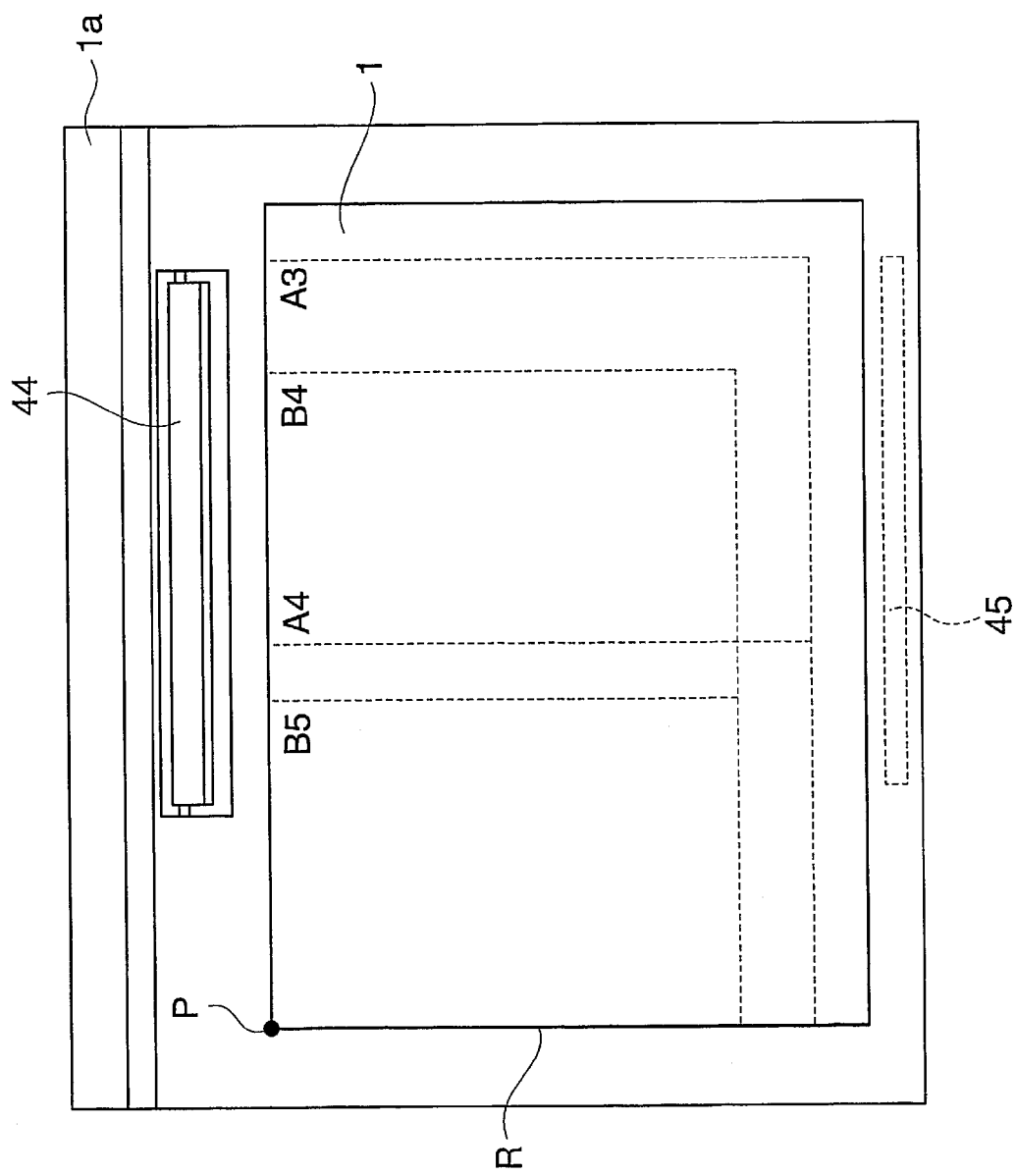
FIG. 2 is a top plan view illustrating a document original size detecting device according to a first embodiment of the present invention.
Figure 3:
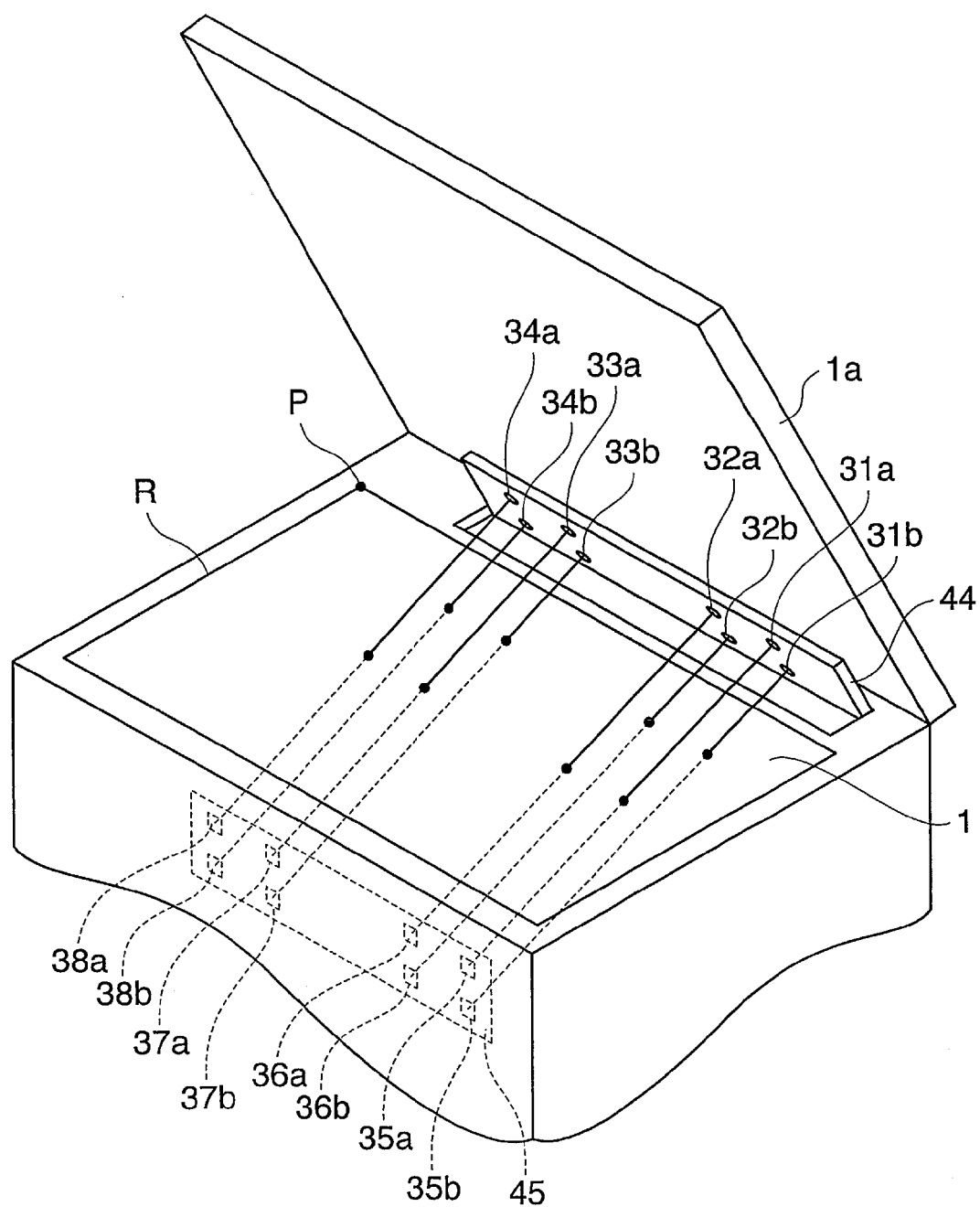
FIG. 3 is a perspective view illustrating the document original size detecting device according to the first embodiment.
Figure 4:
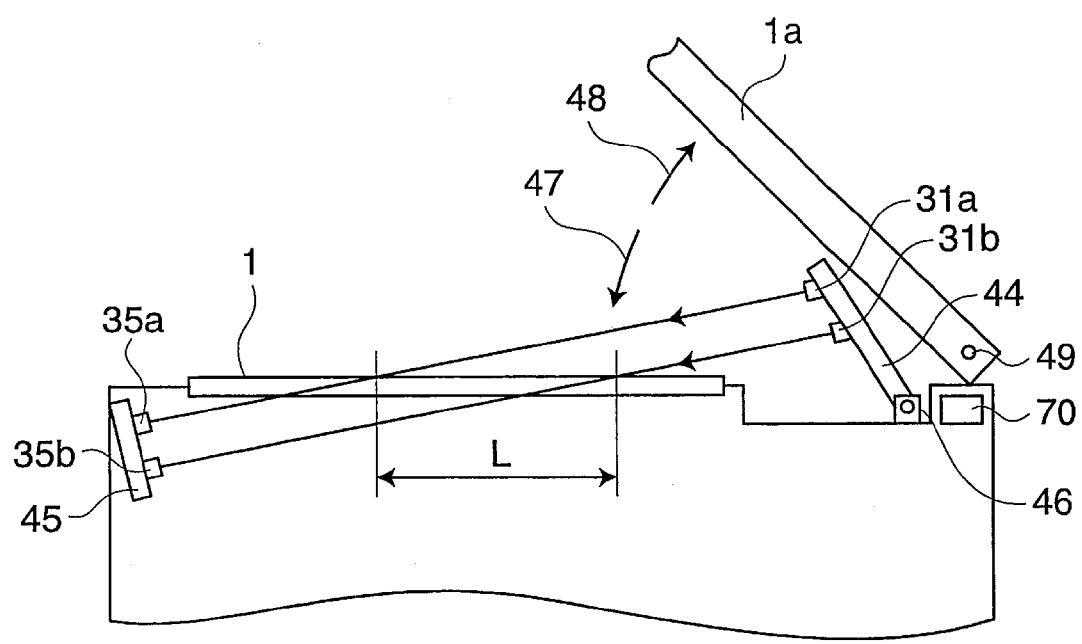
FIG. 4 is a side view illustrating the document original size detecting device according to the first embodiment.
Figure 7:
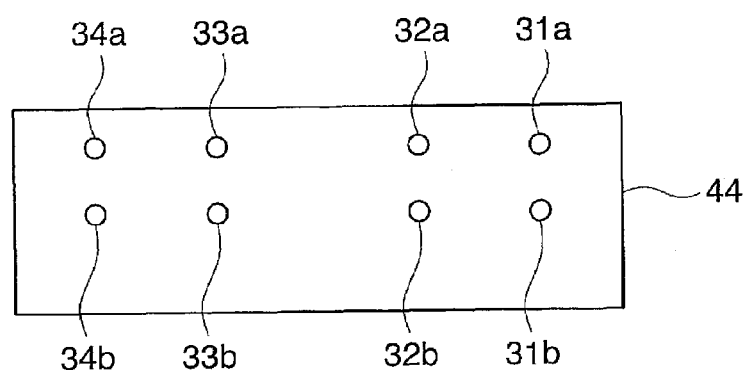
FIG. 7 is a front view illustrating a major portion according to the first embodiment.
Figure 8:
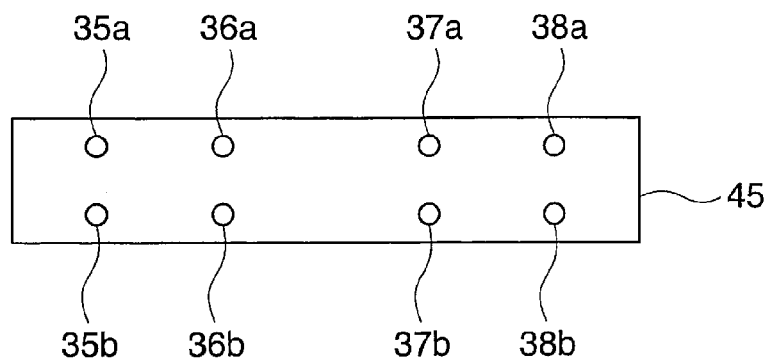
FIG. 8 is a front view illustrating another major portion according to the first embodiment.
Figure 28:
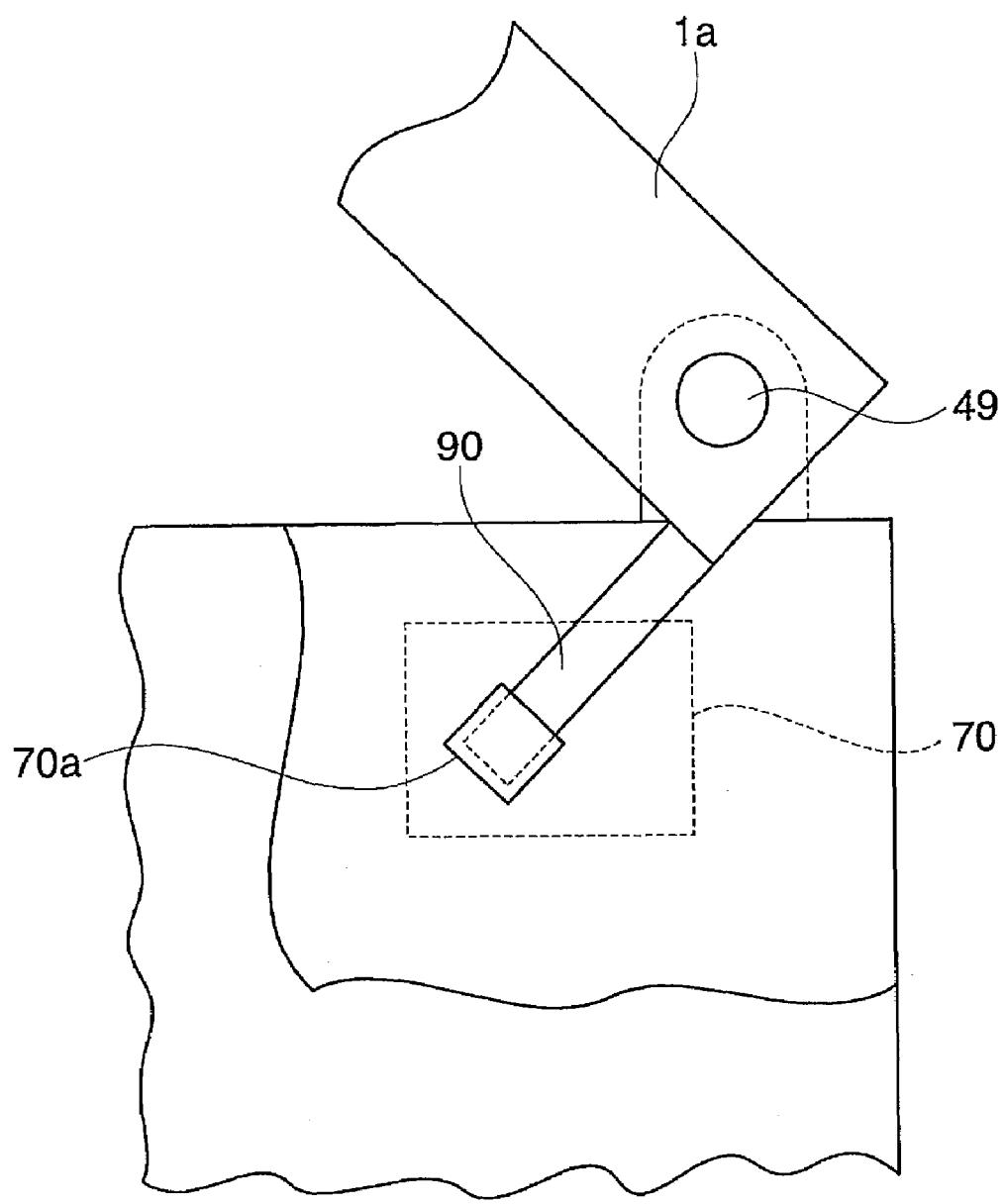
FIG. 28 is an enlarged view illustrating a major portion shown in FIG. 4.

FIG. 2 is a top plan view illustrating a document original size detecting device provided in the image forming apparatus 100 shown in FIG. 1, and FIG. 3 is a perspective view of the document original size detecting device shown in FIG. 2. FIG. 4 is a side view of the document original size detecting device of FIG. 2. FIGS. 7 and 8 are front views illustrating major portions of the document original size detecting device, and FIG. 28 is an enlarged view of a major portion shown in FIG. 4.

As shown in FIG. 2, document originals of the B5, A4, B4 and A3 sizes are each placed on the document platen 1 of transparent glass with a corner thereof coinciding with a reference point P and with an edge thereof aligning with a reference line R. As shown in FIGS. 2 to 4, the document platen 1 includes a light emitting board 44 and a light receiving board 45 for detection of a document original size.

As shown in FIGS. 3, 7 and 8, the light emitting board 44 and the light receiving board 45 are respectively mounted with: paired light emitting diodes (31a, 31b) and paired photodiodes (35a, 35b) for A3 size detection; paired light emitting diodes (32a, 32b) and paired photodiodes (36a, 36b) for B4 size detection; paired light emitting diodes (33a, 33b) and paired photodiodes (37a, 37b) for A4 size detection; and paired light emitting diodes (34a, 34b) and paired photodiodes (38a, 38b) for B5 size detection.

As shown in FIG. 4, the document original cover 1a is pivotally supported by a support shaft 49. When an operator opens the document original cover 1a in an arrow direction 48, the light emitting board 44 is raised in the arrow direction 48 to a predetermined angle about a support point 46 by a spring mechanism not shown. As shown in FIG. 28, an angle sensor 70 is fixed to a main body of the apparatus, and includes a photo interrupter 70a including a light emitting portion and a light receiving portion. A light blocking plate 90 is attached to a lower edge of the document original cover 1a, and allowed to pass through a space defined between the light emitting portion and the light receiving portion of the photo interrupter 70a. When light emitted from the light emitting portion of the photo interrupter 70a is interrupted by the light blocking plate 90, the angle sensor 70 detects the angle of the document original cover 1a reaching the maximum angle. When the light blocking plate 90 is moved away from the photo interrupter 70a, the angle sensor 70 detects the start of closing of the document original cover 1a, and then the document original size detection is started. That is, the light emitting diodes 31a, 31b to 34a, 34b are actuated to emit light beams which, if not blocked, pass through the document platen 1 to be respectively received by the corresponding photodiodes 35a, 35b to 38a, 38b.

The paired light emitting diodes 31a, 31b are arranged so that illumination positions at which the light beams emitted therefrom are incident on the document platen 1 are aligned parallel to the reference line R. The paired light emitting diodes 32a, 32b; 33a, 33b; 34a, 34b are also arranged in this manner.

Where a B5-size document original is placed on the document platen 1 with one corner thereof coinciding with the reference point P and with one edge thereof aligning with the reference line R by the operator as shown in FIG. 2, for example, the light beams emitted from the light emitting diodes 34a, 34b are blocked by the document original, so that the corresponding photodiodes 38a, 38b do not receive the emitted light beams. Thus, the size of the document original is determined to be B5 size.

A positional relationship (a distance L in FIG. 4) between the two illumination positions at which the light beams emitted from the light emitting diodes 34a, 34b are incident on the document platen 1 is defined so that, even if the document original has punch holes and hence one of the light beams emitted from the light emitting diodes 34a, 34b passes through any of the punch holes, the other light beam is blocked by the document original. Therefore, the document original size is correctly determined. The distance L will be described later.

Similarly, where an A4-, B4- or A3-size document original is placed on the document platen 1 with one corner thereof coinciding with the reference point P and with one edge thereof aligning with the reference line R, the light beams emitted from the paired light emitting diodes 33a, 33b; 32a, 32b; or 31a, 31b are blocked by the document original, so that the corresponding photodiodes do not receive the emitted light beams. Thus, the size of the document original is determined to be A4, B4 or A3 size.

Since a positional relationship (distance L in FIG. 4) between the two illumination positions at which the light beams emitted from the light emitting diodes 33a, 33b; 32a, 32b; or 31a, 31b are incident on the document platen 1 is defined so that, even if the document original has punch holes and hence one of the light beams emitted from the light emitting diodes 33a, 33b; 32a, 32b; or 31a, 31b passes through any of the punch holes, the other light beam is blocked by the document original. Therefore, the document original size is correctly determined.

Therefore, the operator opens the document original cover 1a in the arrow direction 48 as shown in FIG. 4, places a document original on the document platen 1 with reference to the reference point P and the reference line R, closes the document original cover 1a in an arrow direction 47, and turns on an actuation switch not shown. Then, the image forming apparatus 100 automatically detects the size of the placed document original, selects one of the sheet feeding trays 11a to 11d corresponding to the document original size, and performs an image forming process.

Figure 5:
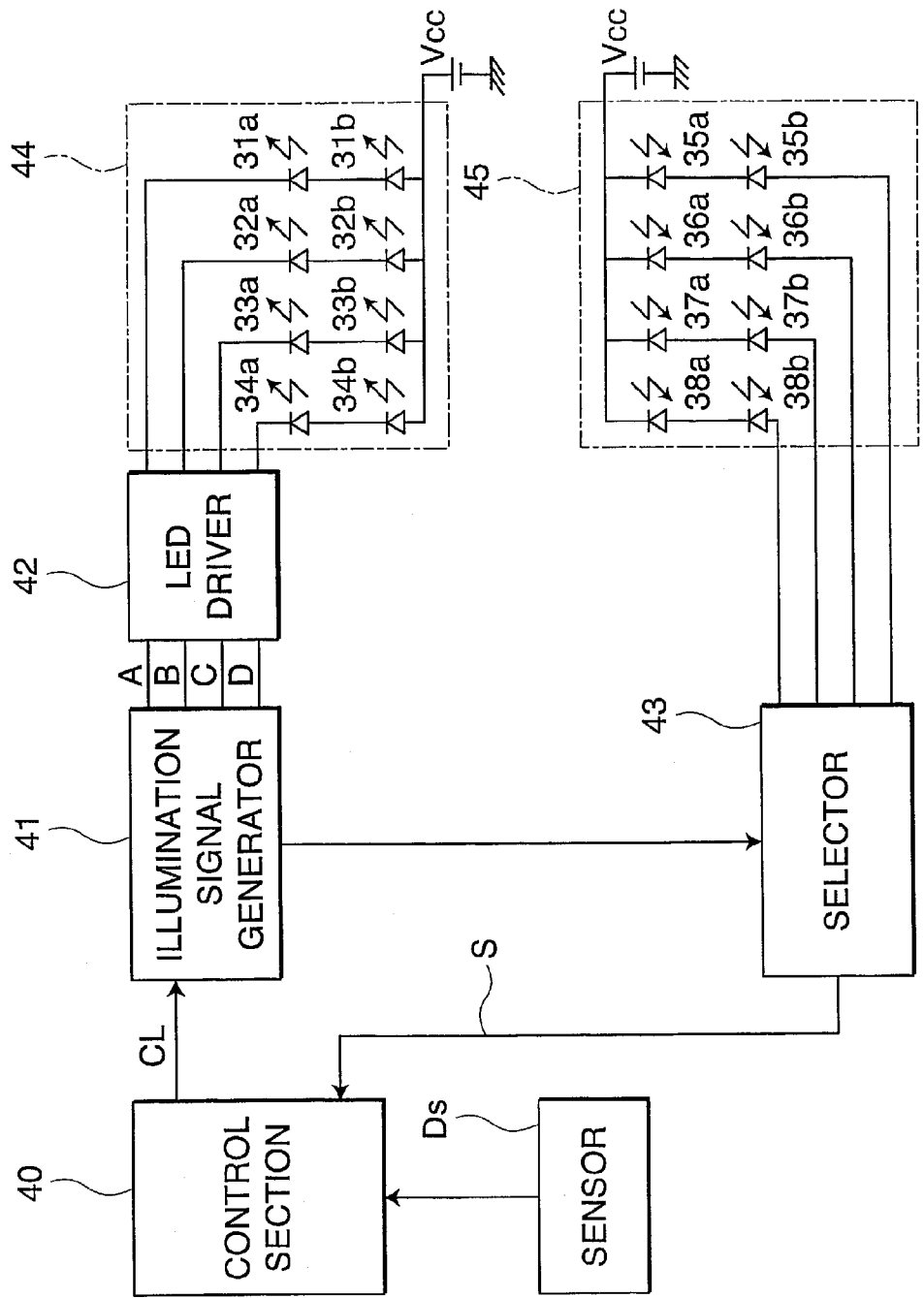
FIG. 5 is a diagram of a control circuit according to the first embodiment.
Figure 6:
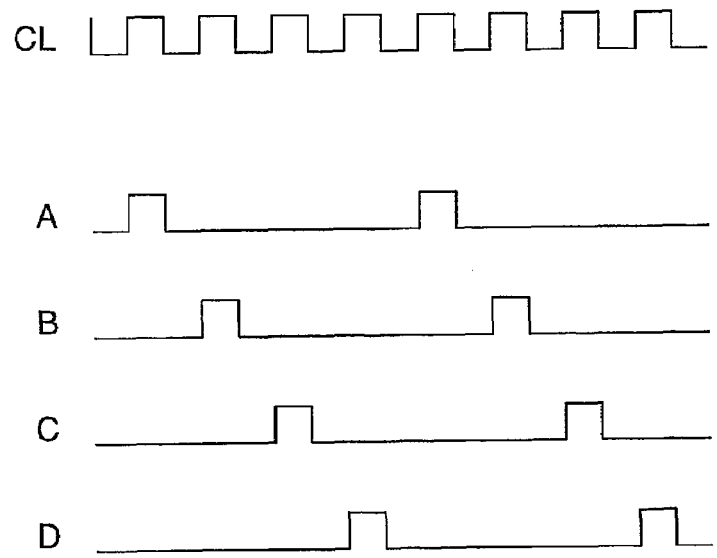
FIG. 6 is a signal waveform diagram for the control circuit according to the first embodiment.

FIG. 5 is a diagram of a control circuit for the document original size detecting device, and FIG. 6 is a signal waveform diagram. With reference to these figures, the operation of the document original size detecting device according to this embodiment will be described in greater detail.

In FIG. 5, a control section 40 includes a microprocessor which includes a CPU, a ROM and a RAM. A sensor Ds shown in FIG. 5 corresponds to the angle sensor 70 (FIG. 4) which outputs a signal when the document original cover 1a (FIG. 4) is opened in the arrow direction 48 to the maximum angle as described above.

When the operator starts closing the document original cover 1a, the control section 40 generates a clock signal CL as shown in FIG. 6 and outputs the clock signal CL to an illumination signal generator 41 upon reception of the signal outputted from the sensor Ds.

The illumination signal generator 41 generates illumination signals A, B, C, D as shown in FIG. 6 on the basis of the clock signal CL, and outputs the illumination signals A, B, C, D to an LED driver 42 and a selector 43. The LED driver 42 sequentially applies an electric current to the serial pairs of light emitting diodes 31a, 31b; 32a, 32b; 33a, 33b; and 34a, 34b from a power source Vcc in synchronization with the illumination signals A, B, C, D to cause the light emitting diodes 31a, 31b; 32a, 32b; 33a, 33b; and 34a, 34b to emit light beams. The selector 43 selectively detects the states (which are either a light reception state or a light non-reception state) of the serial pairs of photodiodes 35a, 35b; 36a, 36b; 37a, 37b; and 38a, 38b each connected to a power source Vcc in synchronization with the illumination signals A, B, C, D, and inputs signals S indicating the results of the detection to the control section 40. Based on the signals S, the control section 40 detects photodiode pairs which are in the light non-reception state, thereby determining the document original size. That is, if both of the serially connected photodiodes 35a, 35b; 36a, 36b; 37a, 37b; or 38a, 38b receive the corresponding light beams, the selector 43 outputs a light reception signal. At this time, the control section 40 judges that the serial photodiode pair 35a, 35b; 36a, 36b; 37a, 37b; or 38a, 38b is in a light unblocked state, which means that the light beams are not blocked by the document original. If the light beams are received by none or either of the serially connected photodiodes 35a, 35b; 36a, 36b; 37a, 37b; or 38a, 38b, the selector 43 outputs no light reception signal. Thus, the control section 40 judges that the serial photodiode pair 35a, 35b; 36a, 36b; 37a, 37b; or 38a, 38b is in a light blocked state, which means that at least one of the light beams is blocked by the document original.

Thus, the light emitting diode pairs 31a, 31b; 32a, 32b; 33a, 33b; and 34a, 34b are periodically actuated to emit light beams, and the selector 43 selects the photodiode pairs 35a, 35b; 36a, 36b; 37a, 37b; and 38a, 38b in synchronization with the light emission to input the light reception signals as the signals S to the control section 40. Therefore, even if any of the photodiode pairs 35a, 35b; 36a, 36b; 37a, 37b; and 38a, 38b receive light (crosstalk light) emitted from non-corresponding light emitting diodes, the signals S are not influenced by the crosstalk light.

The distance L shown in FIG. 4 is defined by the following expression:

$$na+(n-1)b<L<na+nb \qquad (1)$$

wherein a is the diameter of each of the punch holes, b is a distance between each adjacent pair of punch holes, and n is a given natural number.

Where the distance L is defined by the expression (1), there is no possibility that the light beams emitted from each of the light emitting diode pairs simultaneously pass through the punch holes.

Second Embodiment

Figure 9:
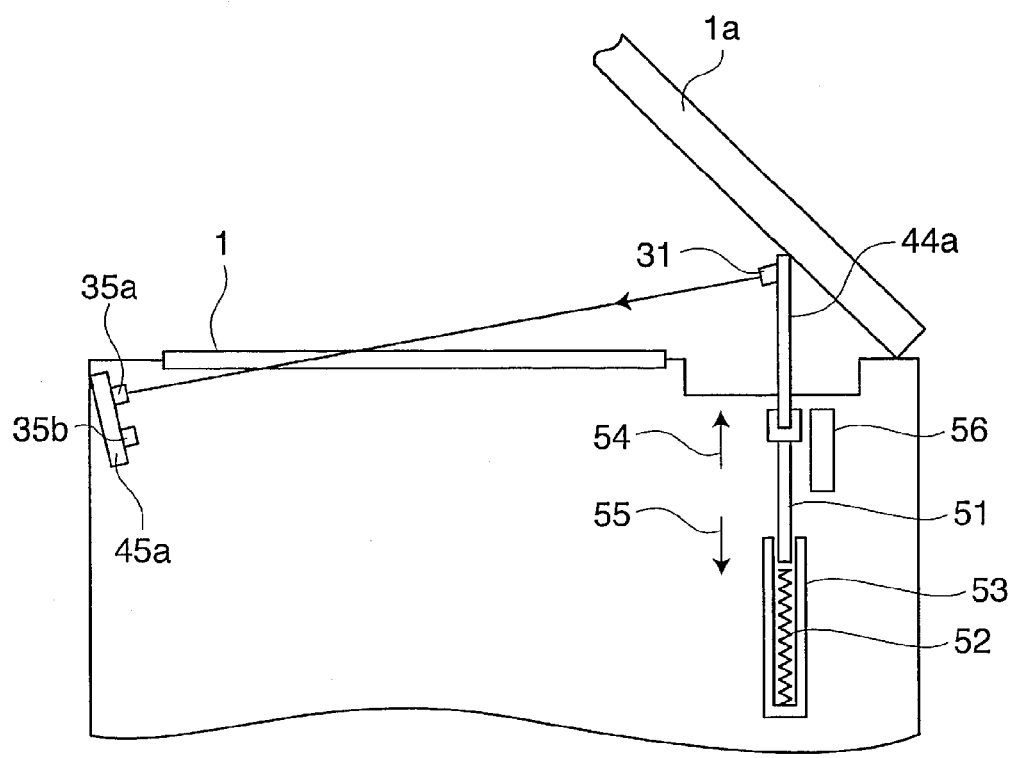
FIG. 9 is a diagram, which corresponds to FIG. 4, illustrating a second embodiment of the present invention.
Figure 10:
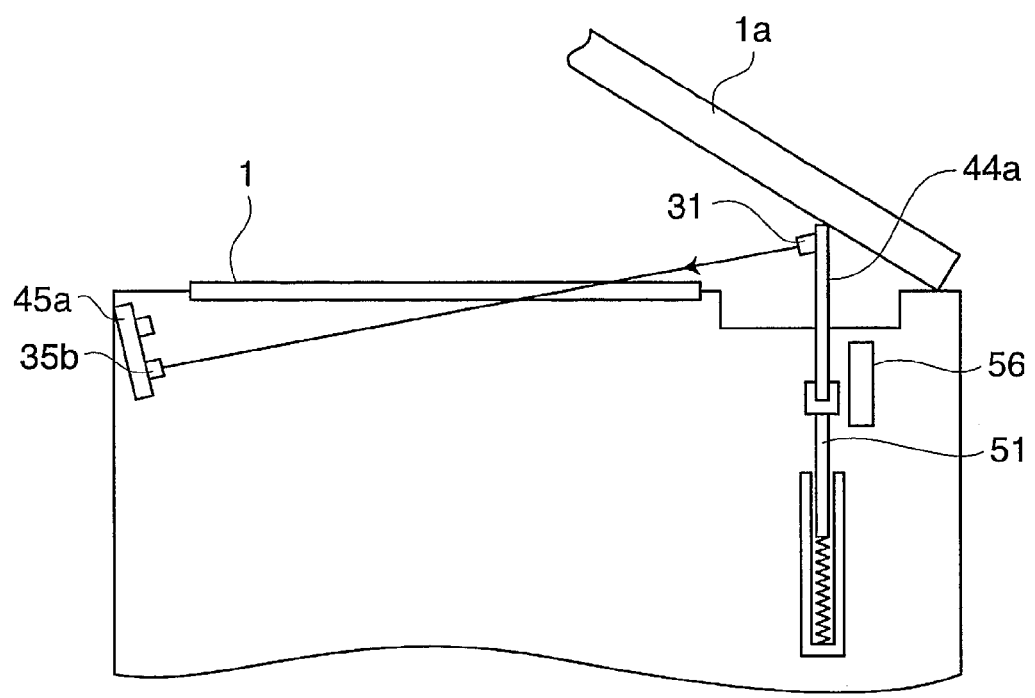
FIG. 10 is a diagram, which corresponds to FIG. 4, illustrating the second embodiment.
Figure 11:
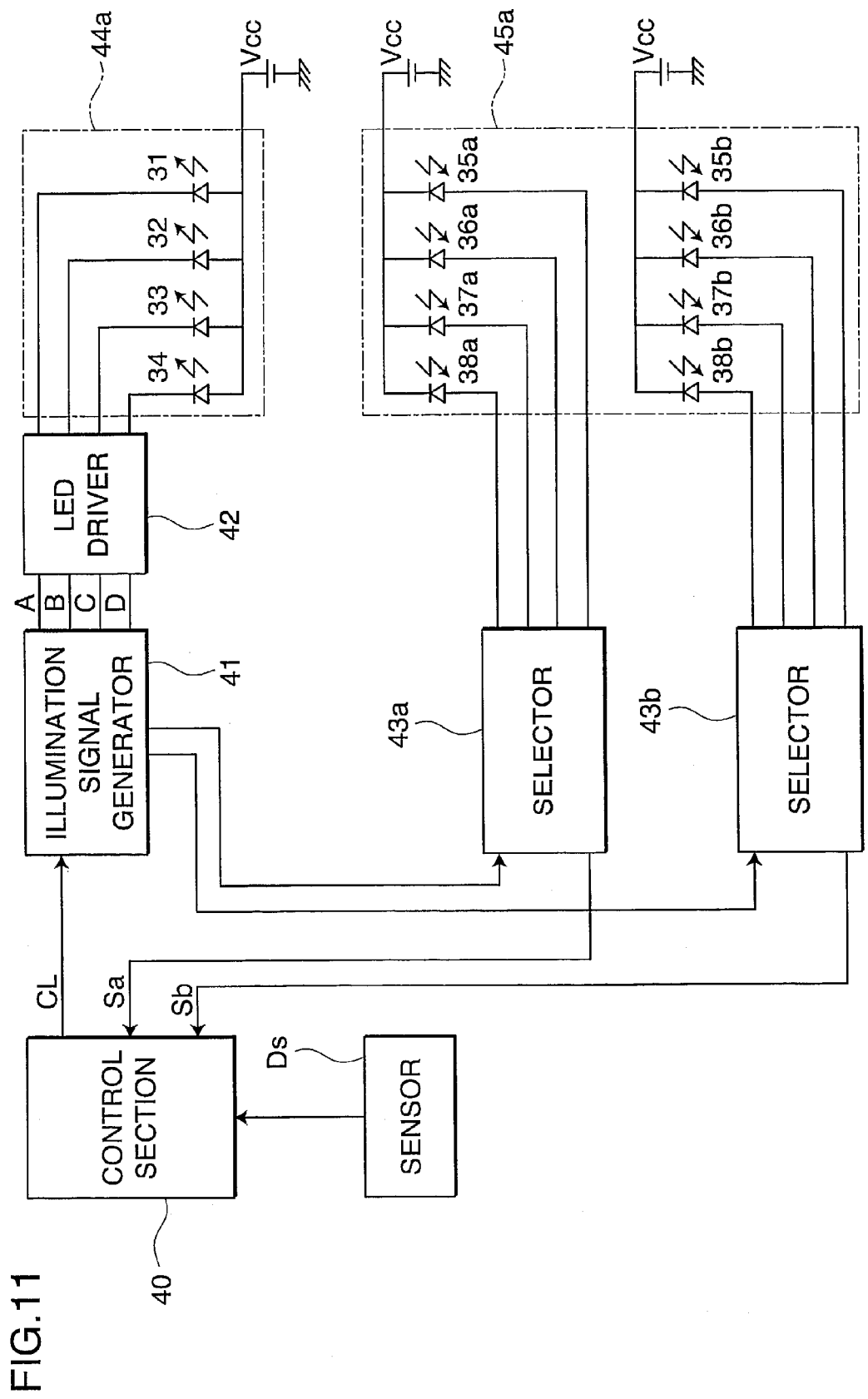
FIG. 11 is a diagram of a control circuit according to the second embodiment.
Figure 12:
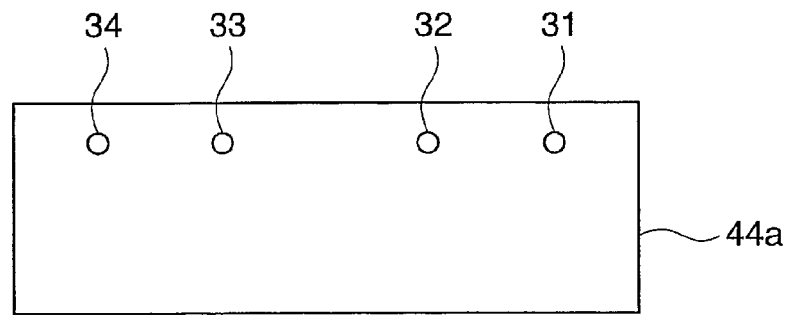
FIG. 12 is a front view illustrating a major potion according to the second embodiment.

FIGS. 9 and 10 illustrate a second embodiment, and correspond to FIG. 4 illustrating the first embodiment. FIG. 11 is a diagram of a control circuit according to the second embodiment. FIG. 12 is a diagram corresponding to FIG. 7.

In a document original size detecting device according to the second embodiment shown in these figures, a light emitting board 44a and a light receiving board 45a are respectively employed instead of the light emitting board 44 and the light receiving board 45 employed in the first embodiment.

Four light emitting diodes 31, 32, 33, 34 which respectively correspond to the four pairs of light emitting diodes 31a, 31b; 32a, 32b; 33a, 33b; and 34a, 34b provided on the light emitting board 44 shown in FIG. 7 are mounted on the light emitting board 44a. As shown in FIGS. 9 and 10, the light emitting board 44a is connected to a slidable member 51, and supported via the slidable member 51 by a support member 53 having a spring 52.

The light emitting board 44a is constantly biased in an arrow direction 54 by the spring 52 with an upper edge thereof kept in contact with the document original cover 1a. When the document original cover 1a is opened, the light emitting board 44a is moved upward in the arrow direction 54 as shown in FIG. 9, whereby the light emitting diodes 31 to 34 shown in FIG. 12 each reach a position as shown in FIG. 9. This position corresponds to the position of each of the light emitting diodes 31a to 34a shown in FIG. 4.

When the operator starts closing the document original cover 1a, the light emitting board 44a is moved downward in an arrow direction 55. After the light emitting diodes 31 to 34 each reach a position, as shown in FIG. 10, which corresponds to the position of each of the light emitting diodes 31b to 34b shown in FIG. 4, the light emitting diodes 31 to 34 are further moved downward. The position of each of the light emitting diodes 31 to 34 is detected by a position sensor 56.

Like the light receiving board 45 shown in FIG. 8 in the first embodiment, the light receiving board 45a includes pairs of photodiodes 35a, 35b; 36a, 36b; 37a, 37b; and 38a, 38b. On the light receiving board 45a, the photodiodes 35a to 38a are adapted to receive light beams emitted from the light emitting diodes 31 to 34 each located at the position shown in FIG. 9, while the photodiodes 35*b* to 38*b* are adapted to receive light beams emitted from the light emitting diodes 31 to 34 each located at the position shown in FIG. 10.

Next, the operation of the document original size detecting device according to the second embodiment will be described with reference to the control circuit diagram of FIG. 11.

In this embodiment, a sensor Ds shown in FIG. 11 corresponds to the position sensor 56 shown in FIG. 9, and is adapted to output a signal when the light emitting diodes 31 to 34 are each located at the position shown in FIG. 9 or 10.

When the operator opens the document original cover 1*a* and the light emitting diodes 31 to 34 each reach the position shown in FIG. 9, the sensor Ds outputs a signal. Upon reception of the signal outputted from the sensor Ds, a control section 40 outputs a clock signal CL as shown in FIG. 6 to an illumination signal generator 41. The illumination signal generator 41 generates illumination signals A, B, C, D as shown in FIG. 6 on the basis of the clock signal CL, and outputs the illumination signals A, B, C, D to an LED driver 42 and a selector 43*a*. The LED driver 42 sequentially actuates the light emitting diodes 31 to 34 in synchronization with the illumination signals A, B, C, D. The selector 43*a* sequentially selects the photodiodes 35*a* to 38*a* in synchronization with the illumination signals A, B, C, D to input signals Sa indicating the states (which are either a light reception state or a light non-reception state) of the photodiodes 35*a* to 38*a* to the control section 40.

When the operator starts closing the document original cover 1*a* and the light emitting diodes 31 to 34 each reach the position shown in FIG. 10, the sensor Ds outputs a signal again. Upon reception of the signal outputted from the sensor Ds, the control section 40 outputs a clock signal CL as shown in FIG. 6 to the illumination signal generator 41. The illumination signal generator 41 generates illumination signals A, B, C, D as shown in FIG. 6 on the basis of the clock signal CL, and outputs the illumination signals A, B, C, D to the LED driver 42 and a selector 43*b*. The LED driver 42 sequentially actuates the light emitting diodes 31 to 34 in synchronization with the illumination signals A, B, C, D. The selector 43*b* sequentially selects the photodiodes 35*b* to 38*b* in synchronization with the illumination signals A, B, C, D to input signals Sb indicating the states (which are either a light reception state or a light non-reception state) of the photodiodes 35*a* to 38*a* to the control section 40. The control section 40 determines a document original size on the basis of the logical products of the signals Sa and Sb. If both of the signals Sa, Sb for a given photodiode pair indicate the light reception state, the control section 40 judges that the photodiode pair is in a light unblocked state, which means that the light beams emitted from the corresponding light emitting diode are not blocked by the document original. If either one of the signals Sa, Sb for the given photodiode pair indicates the light reception state and the other signal for the given photodiode pair indicates the light non-reception state, or if both of the signals Sa, Sb for the given photodiode pair indicate the light non-reception states, the control section 40 judges that the photodiode pair is in a light blocked state, which means that at least one of the light beams is blocked by the document original.

Third Embodiment

Figure 13:
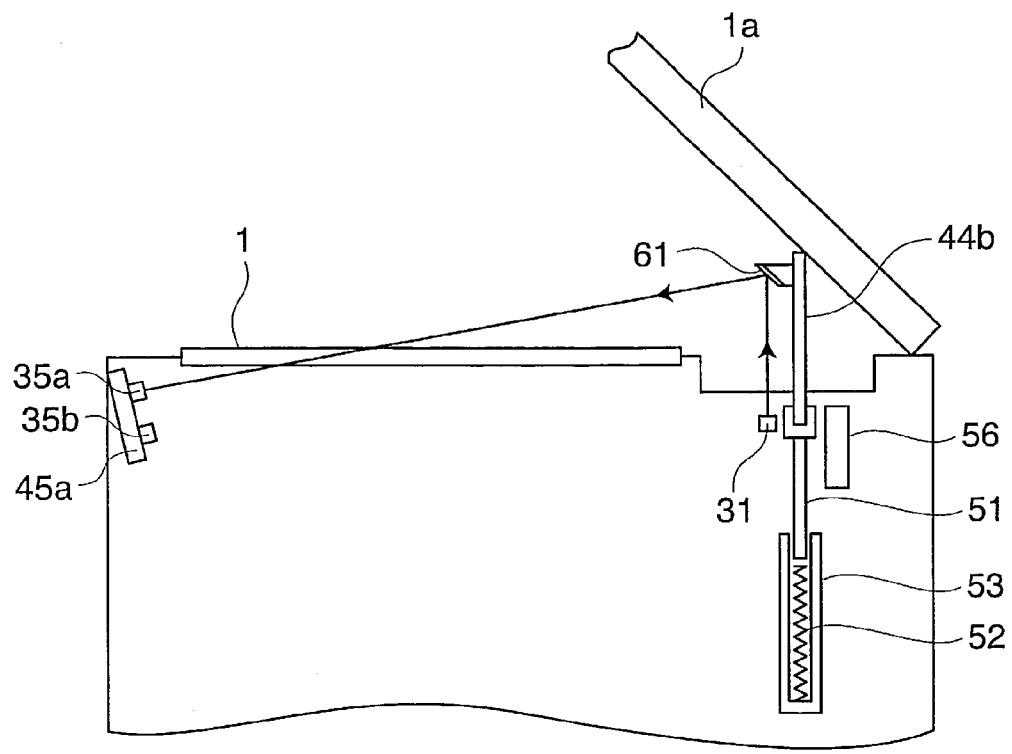
FIG. 13 is a diagram, which corresponds to FIG. 9, illustrating a third embodiment of the present invention.
Figure 14:
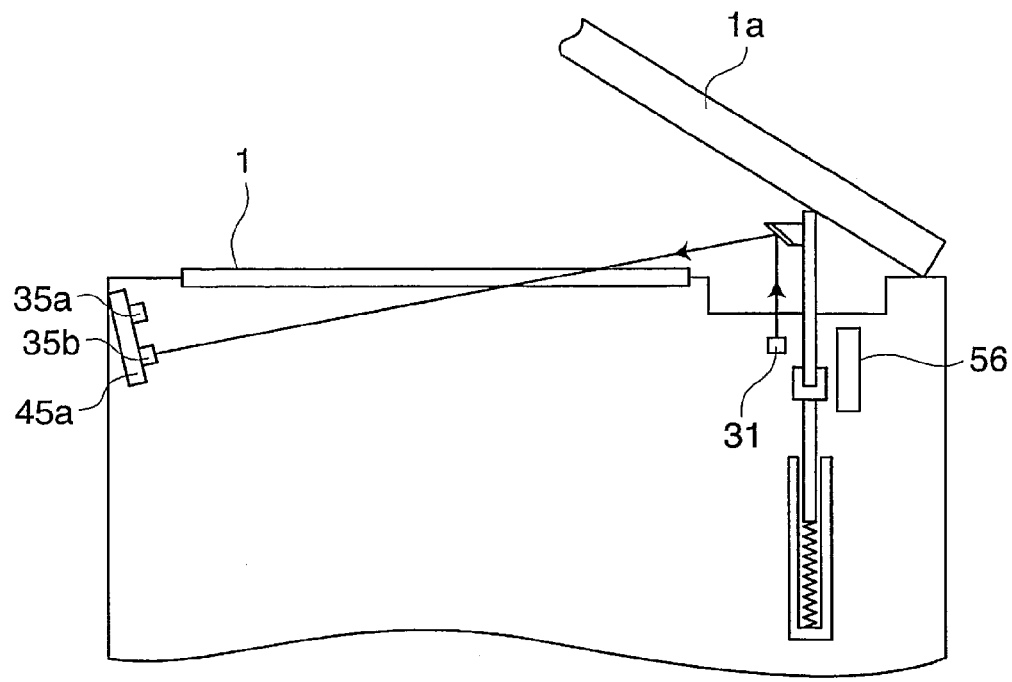
FIG. 14 is a diagram, which corresponds to FIG. 10, illustrating the third embodiment.
Figure 15:
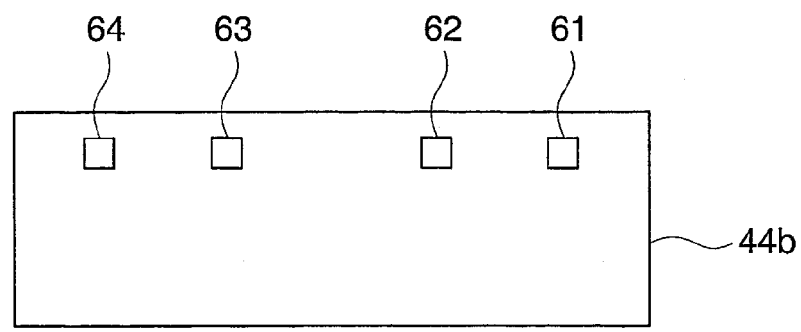
FIG. 15 is a front view illustrating a major portion according to the third embodiment.

FIGS. 13 and 14 illustrate a third embodiment, and respectively correspond to FIGS. 9 and 10 illustrating the second embodiment. FIG. 15 corresponds to FIG. 12.

A document original size detecting device according to the third embodiment has substantially the same construction as that of the second embodiment, except that a light emitting board 44*b* mounted with mirrors 61 to 64 as shown in FIG. 15 is employed instead of the light emitting board 44*a* and the light emitting diodes 31 to 34 are provided in the main body of the apparatus. A control circuit of the third embodiment has the same configuration as that shown in FIG. 11.

As shown in FIGS. 13 and 14, light beams emitted from the light emitting diodes 31 to 34 are guided toward the light receiving board 45*a* via the mirrors 61 to 64 provided on the light emitting board 44*b*.

In the third embodiment, therefore, a document original size is determined in the same manner as in the second embodiment.

Fourth Embodiment

Figure 16:
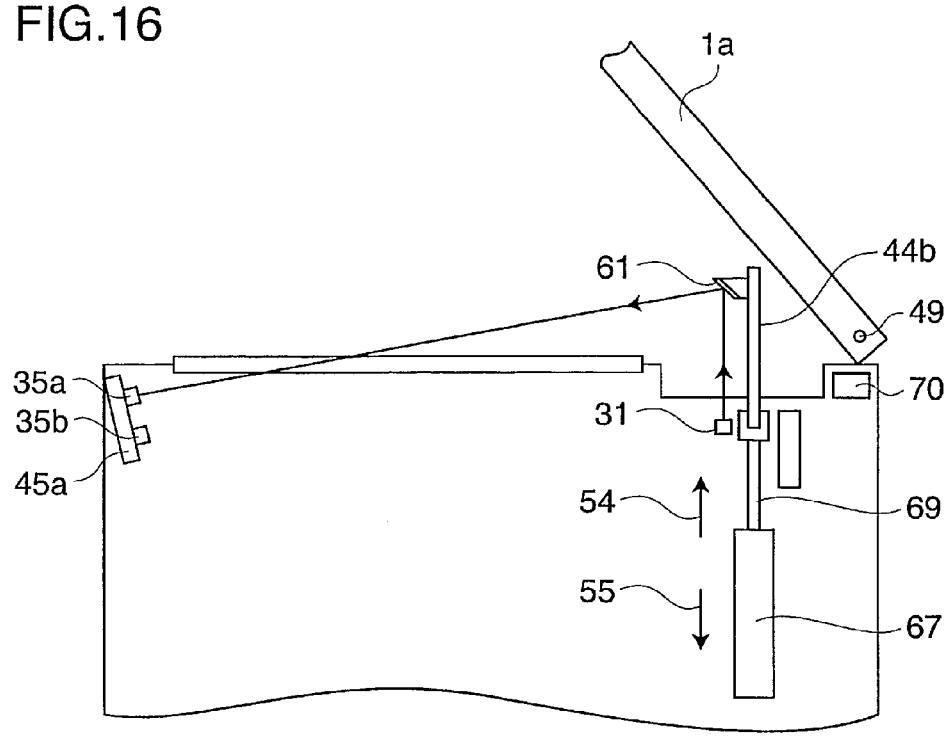
FIG. 16 is a diagram, which corresponds to FIG. 13, illustrating a fourth embodiment of the present invention.
Figure 17:
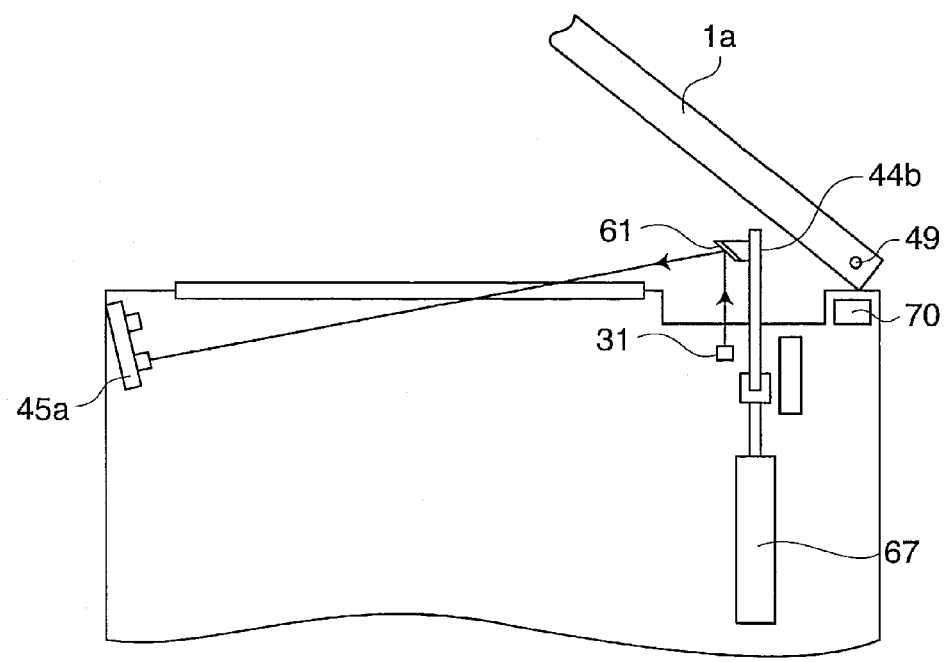
FIG. 17 is a diagram, which corresponds to FIG. 14, illustrating the fourth embodiment.

FIGS. 16 and 17 illustrate a fourth embodiment, and respectively correspond to FIGS. 13 and 14 illustrating the third embodiment. A document original size detecting device according to the fourth embodiment has substantially the same construction as that of the third embodiment, except that a linear actuator 67 having a movable member 69 is employed instead of the support member 53, the slidable member 51 and the spring 52, and an angle sensor 70 for detecting the angle of the document original cover 1*a* as employed in the first embodiment is employed instead of the position sensor 56.

The linear actuator 67 includes a stepping motor incorporated therein, and serves as a linear movement mechanism which linearly moves the movable member 69 in arrow directions 54, 55. The light emitting board 44*b* is provided on a distal portion of the movable member 69 of the linear actuator 67, so that the mirrors 61 to 64 are movable in the arrow directions 54 and 55.

Figure 18:
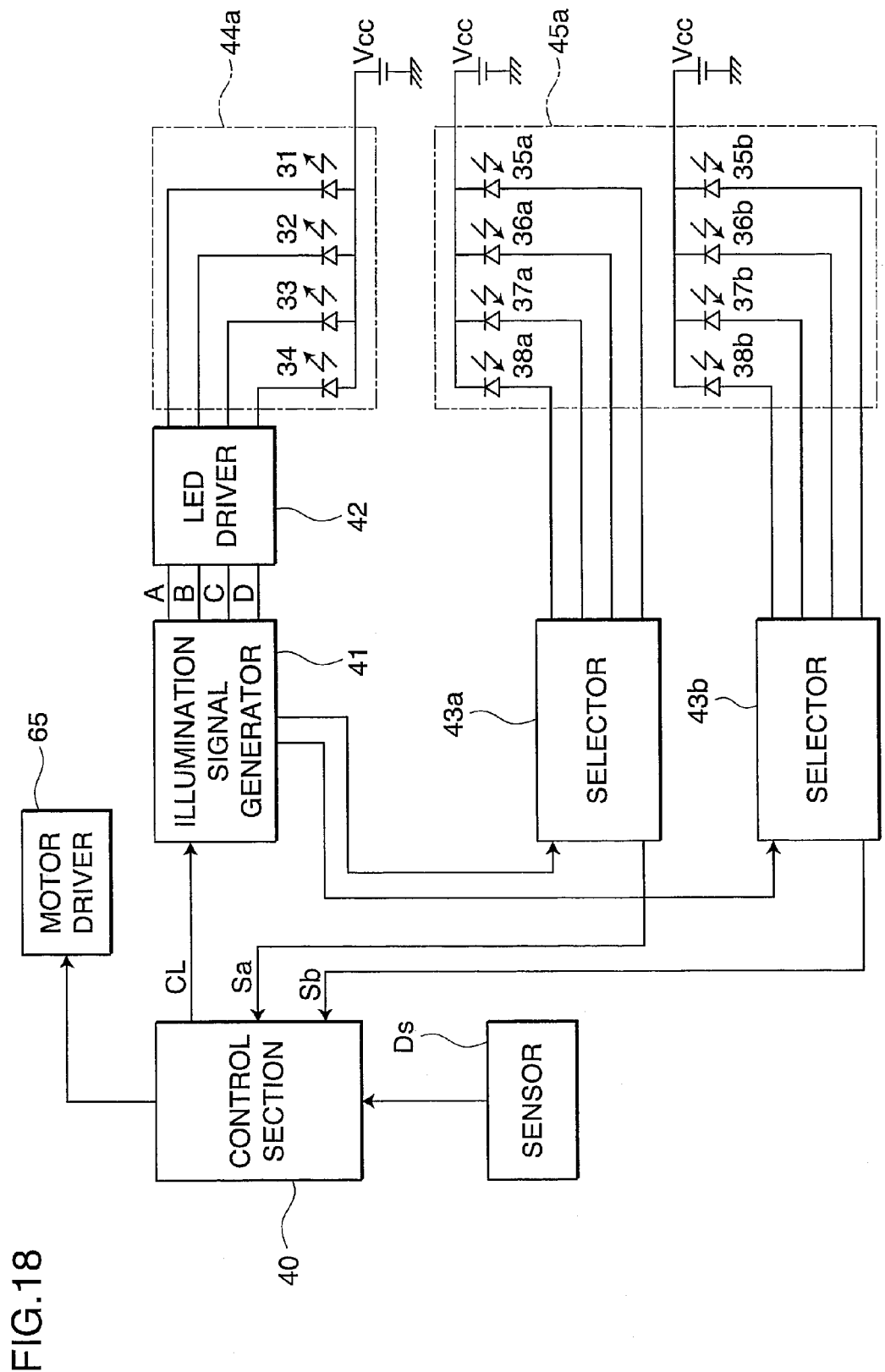
FIG. 18 is a diagram of a control circuit according to the fourth embodiment.

FIG. 18 is a diagram of a control circuit according to the fourth embodiment. The control circuit has substantially the same configuration as that shown in FIG. 11, except that a motor driver 65 for driving the stepping motor of the linear actuator 67 is additionally employed. A sensor Ds shown in FIG. 18 corresponds to the angle sensor 70 (FIG. 28) which detects the angle of the document original cover 1*a* as shown in FIGS. 16 and 17.

With this arrangement, when the operator opens the document original cover 1*a* as shown in FIG. 16, the sensor Ds outputs a signal. Upon reception of the signal outputted from the sensor Ds, the control section 40 shown in FIG. 18 causes the motor driver 65 to drive the linear actuator 67 to move the mirrors 61 to 64 to a position as shown in FIG. 16. When the operator starts closing the document original cover 1*a*, the control section 40 causes the light emitting diodes 31 to 34 to sequentially emit light beams in response to a signal outputted from the sensor Ds. Then, the light beams emitted from the light emitting diodes 31 to 34, if not blocked, are respectively received by the photodiodes 35*a* to 38*a*.

In turn, the control section 40 drives the linear actuator 67 to move the mirrors 61 to 64 downward to a position as shown in FIG. 17, and causes the light emitting diodes 31 to 34 to sequentially emit light beams which, if not blocked, are respectively received by the photodiodes 35*b* to 38*b*. A method of driving the light emitting diodes 31 to 34, a method of selecting signals of the photodiodes 35*a* to 38*a* and 35*b* to 38*b* and a method of detecting a document original size are substantially the same as those in the second embodiment.

Fifth Embodiment

Figure 19:
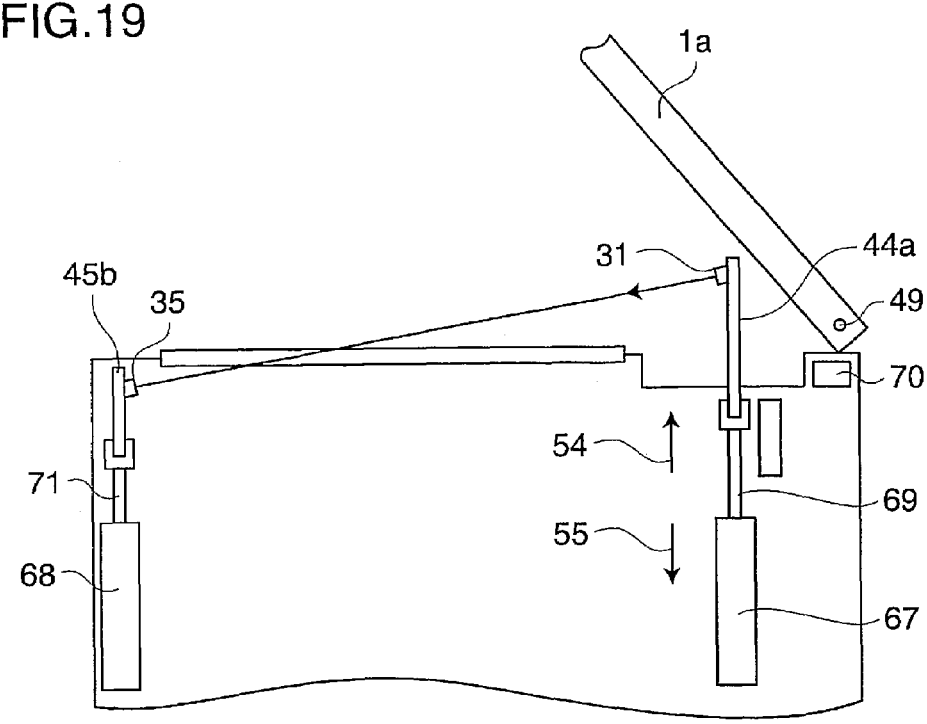
FIG. 19 is a diagram, which corresponds to FIG. 16, illustrating a fifth embodiment of the present invention.
Figure 20:
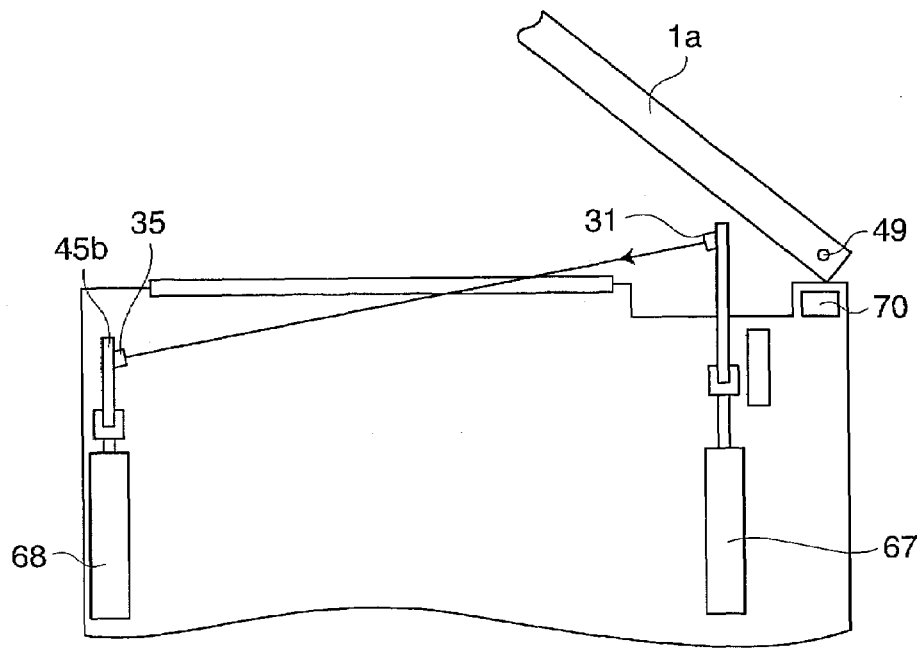
FIG. 20 is a diagram, which corresponds to FIG. 17, illustrating the fifth embodiment.

FIGS. 19 and 20 illustrate a fifth embodiment, and respectively correspond to FIGS. 16 and 17 illustrating the fourth embodiment.

Figure 22:
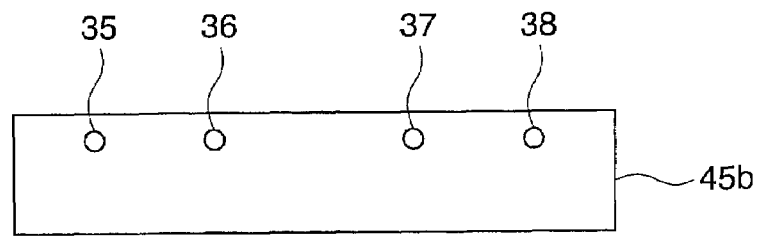
FIG. 22 is a front view illustrating a major portion according to the fifth embodiment.

A document original size detecting device according to the fifth embodiment has substantially the same construction as that of the fourth embodiment, except that a light emitting board 44a as shown in FIG. 12 is employed instead of the light emitting board 44b (FIG. 16), and a light receiving board 45b (as shown in FIGS. 19 and 22) supported by a linear actuator 68 having a movable member 71 is employed instead of the light receiving board 45a (FIG. 16). Like the linear actuator 67, the linear actuator 68 is a linear movement mechanism which includes a stepping member incorporated therein and is adapted to linearly move the movable member 71.

Photodiodes 35, 36, 37, 38 which respectively correspond to the photodiode pairs 35a, 35b; 36a, 36b; 37a, 37b; and 38a, 38b of the light receiving board 45 (FIG. 8) are mounted on the light receiving board 45b shown in FIG. 22.

Figure 21:
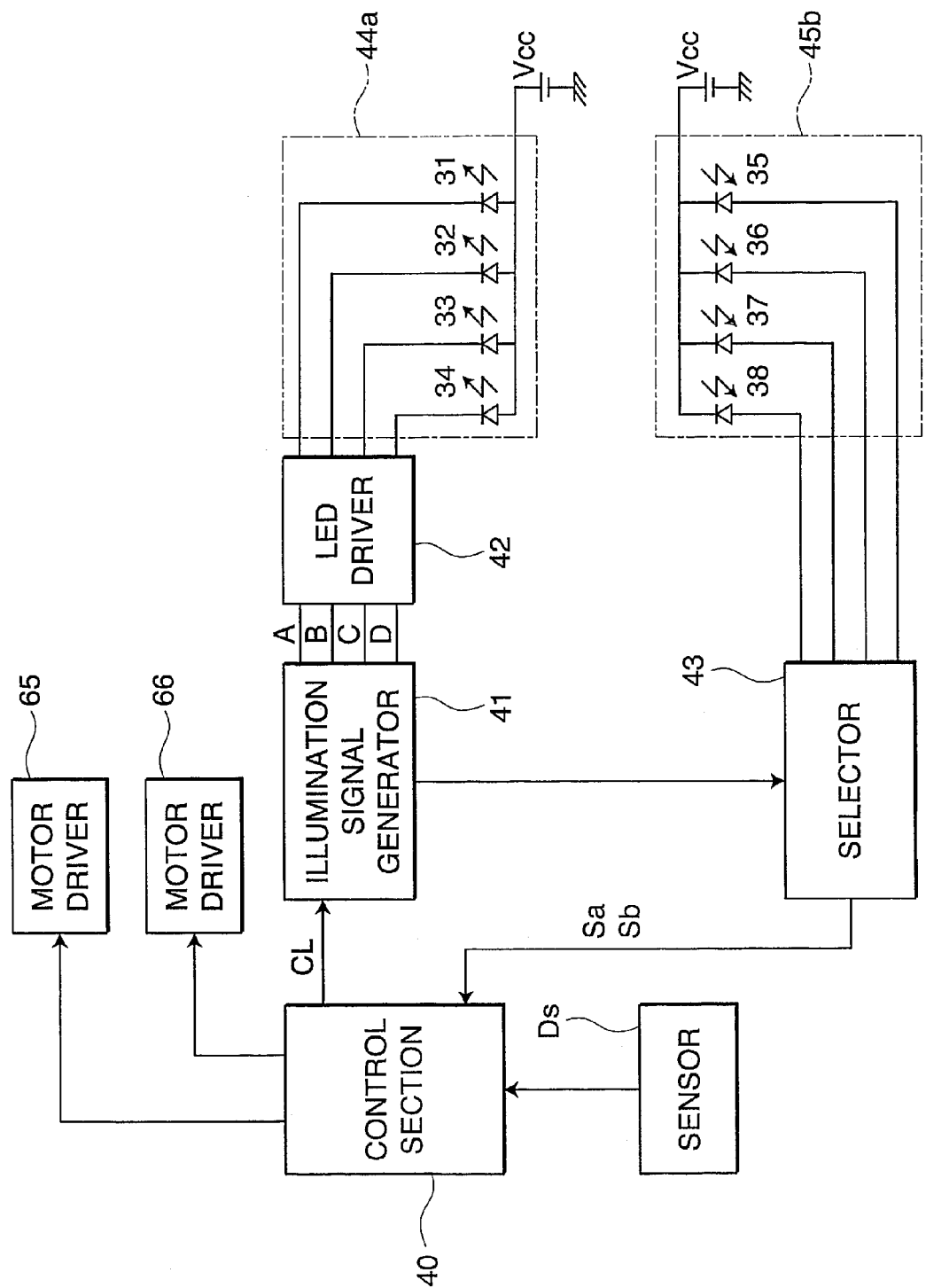
FIG. 21 is a diagram of a control circuit according to the fifth embodiment.

FIG. 21 is a diagram of a control circuit according to the fifth embodiment. The control circuit of the fifth embodiment has substantially the same configuration as that of the fourth embodiment, except that the light receiving board 45b and a selector 43 are respectively employed instead of the light receiving board 45a and the selectors 43a, 43b and a motor driver 66 for the linear actuator 68 is additionally employed.

With this arrangement, when the operator opens the document original cover 1a as shown in FIG. 19, the control section 40 shown in FIG. 21 causes the motor driver 65, 66 to drive the linear actuators 67, 68 upon reception of an output of the sensor Ds to move the light emitting diodes 31 to 34 and the photodiodes 35 to 38 upward in an arrow direction 54 to positions as shown in FIG. 19. When the operator starts closing the document original cover 1a, the control section 40 causes the light emitting diodes 31 to 34 to sequentially emit light beams upon reception of an output of the sensor Ds. The selector 43 sequentially selects the photodiodes 35 to 38 in synchronization with the light emission of the light emitting diodes 31 to 34 to input signals Sa indicating the states (which are either a light reception state or a light non-reception state) of the photodiodes 35 to 38 to the control section 40.

Then, the control section 40 drives the linear actuators 67, 68 to move the light emitting diodes 31 to 34 and the photodiodes 35 to 38 downward in an arrow direction 55 to positions as shown in FIG. 20, and causes the light emitting diodes 31 to 34 to sequentially emit light beams.

The selector 43 selects the photodiodes 35 to 38 in synchronization with the light emission of the light emitting diodes 31 to 34 to input signals Sb indicating the states (which are either a light reception state or a light non-reception state) of the photodiodes 35 to 38 to the control section 40. The control section 40 determines a document original size on the basis of the logical products of the signals Sa and Sb. If both of the signals Sa, Sb for a given photodiode indicate the light reception state, the control section 40 judges that the photodiode is in a light unblocked state, which means that the light beams emitted from the corresponding light emitting diode are not blocked by the document original. If either one of the signals Sa, Sb for the given photodiode indicates the light reception state and the other signal for the given photodiode indicates the light non-reception state, or if both of the signals Sa, Sb for the given photodiode indicate the light non-reception states, the control section 40 judges that the photodiode is in a light blocked state, which means that at least one of the light beams is blocked by the document original.

Sixth Embodiment

Figure 23:
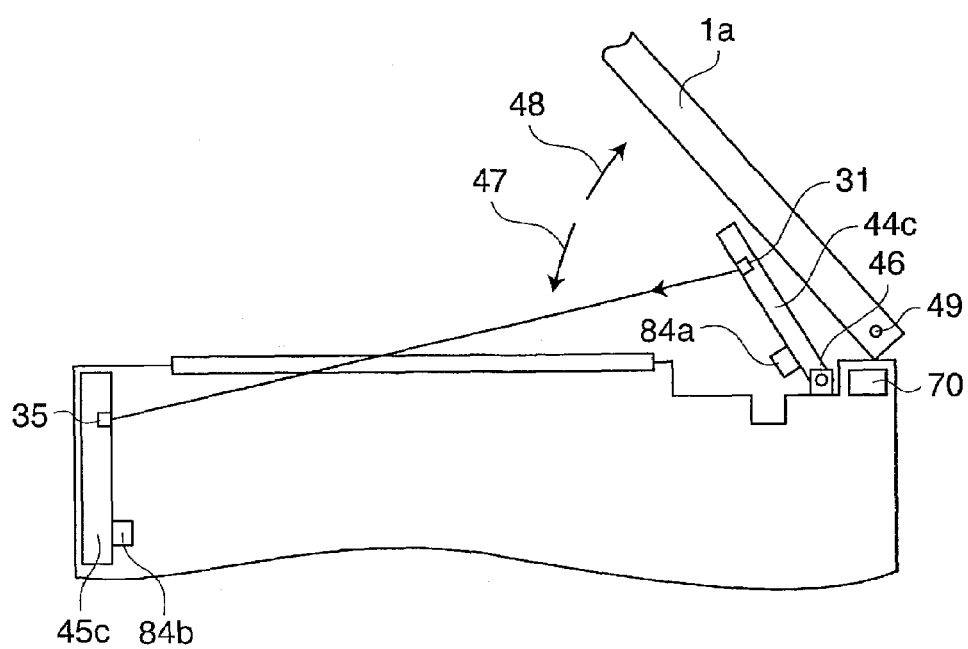
FIG. 23 is a diagram, which corresponds to FIG. 19, illustrating a sixth embodiment of the present invention.
Figure 24:
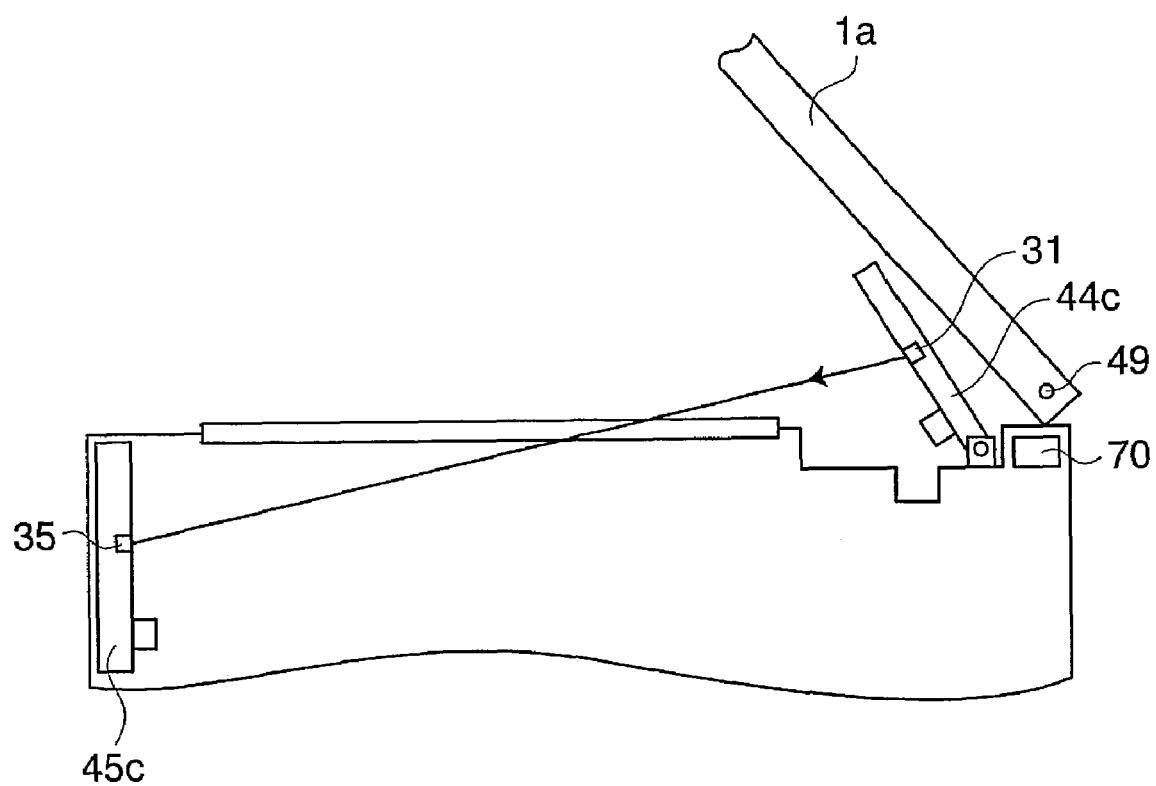
FIG. 24 is a diagram, which corresponds to FIG. 20, illustrating the sixth embodiment.

FIGS. 23 and 24 illustrate a sixth embodiment, and respectively correspond to FIGS. 19 and 20.

A document original size detecting device according to the sixth embodiment has substantially the same construction as that of the fifth embodiment, except that a light emitting board 44c and a light receiving board 45c are respectively employed instead of the light emitting board 44a/the linear actuator 67 and the light receiving board 45b/the linear actuator 68.

Figure 25:
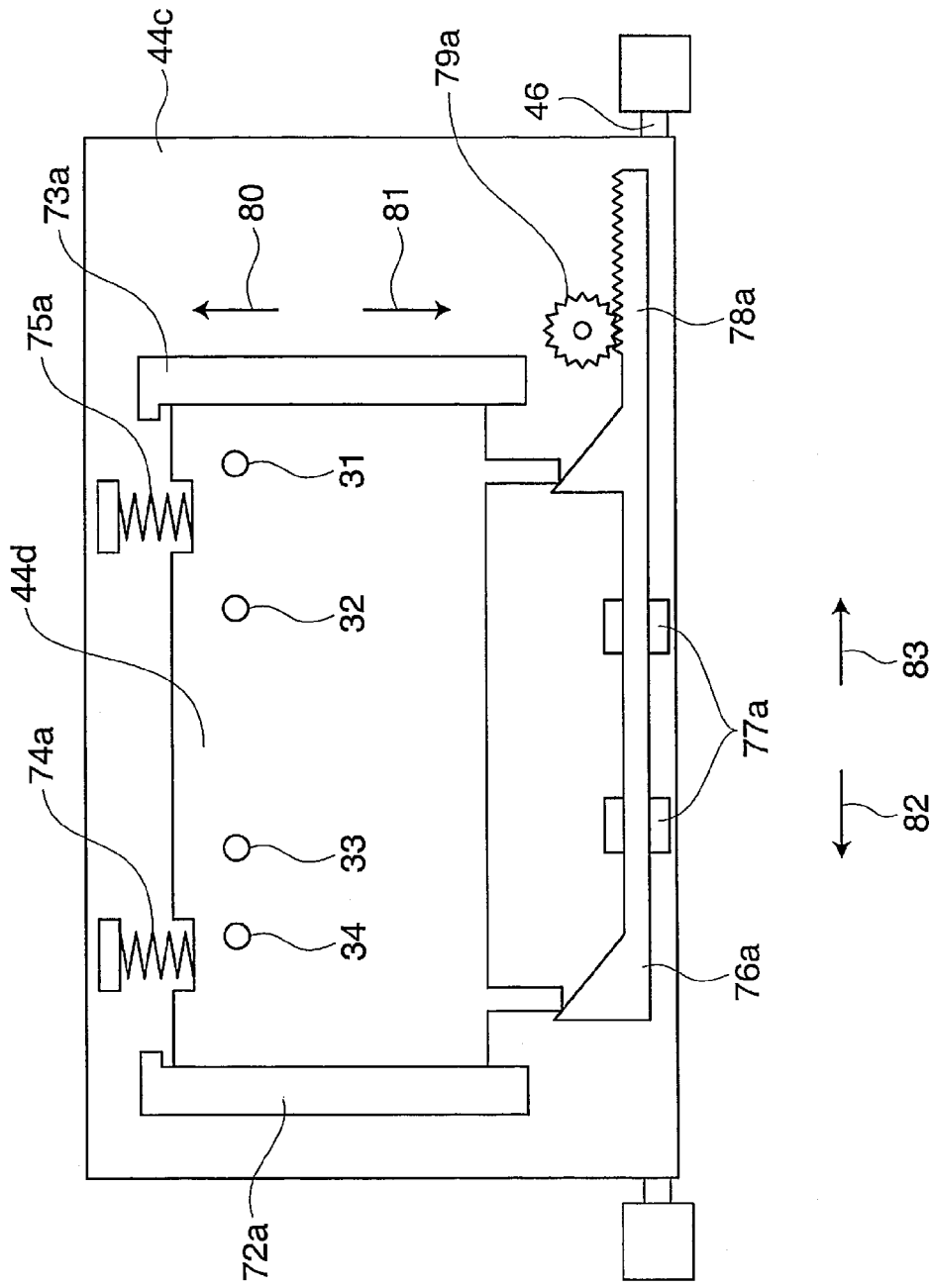
FIG. 25 is a front view illustrating a major portion according to the sixth embodiment.

FIG. 25 is a front view of the light emitting board 44c. The light emitting board 44c includes a secondary board 44d. The secondary board 44d is supported slidably in arrow directions 80, 81 by slide guides 72a, 73a, and biased in an arrow direction 81 by springs 74a, 75a.

Light emitting diodes 31 to 34 as shown in FIG. 12 are mounted on the secondary board 44d. The secondary board 44d is connected to a cam 76a supported slidably in arrow directions 82, 83 by slide guides 77a. When a pinion 79a meshed with a rack 78a provided on the cam 76a is driven by a stepping motor 84a (FIG. 23), the secondary board 44d (i.e., the light emitting diodes 31 to 34) is moved in the arrow directions 80, 81.

When the document original cover 1a is fully opened as shown in FIG. 23, the light emitting board 44c is raised in an arrow direction 48 by a spring mechanism not shown about a support point 46 as in the case of the light emitting board 44 (FIG. 4) of the first embodiment.

Figure 26:
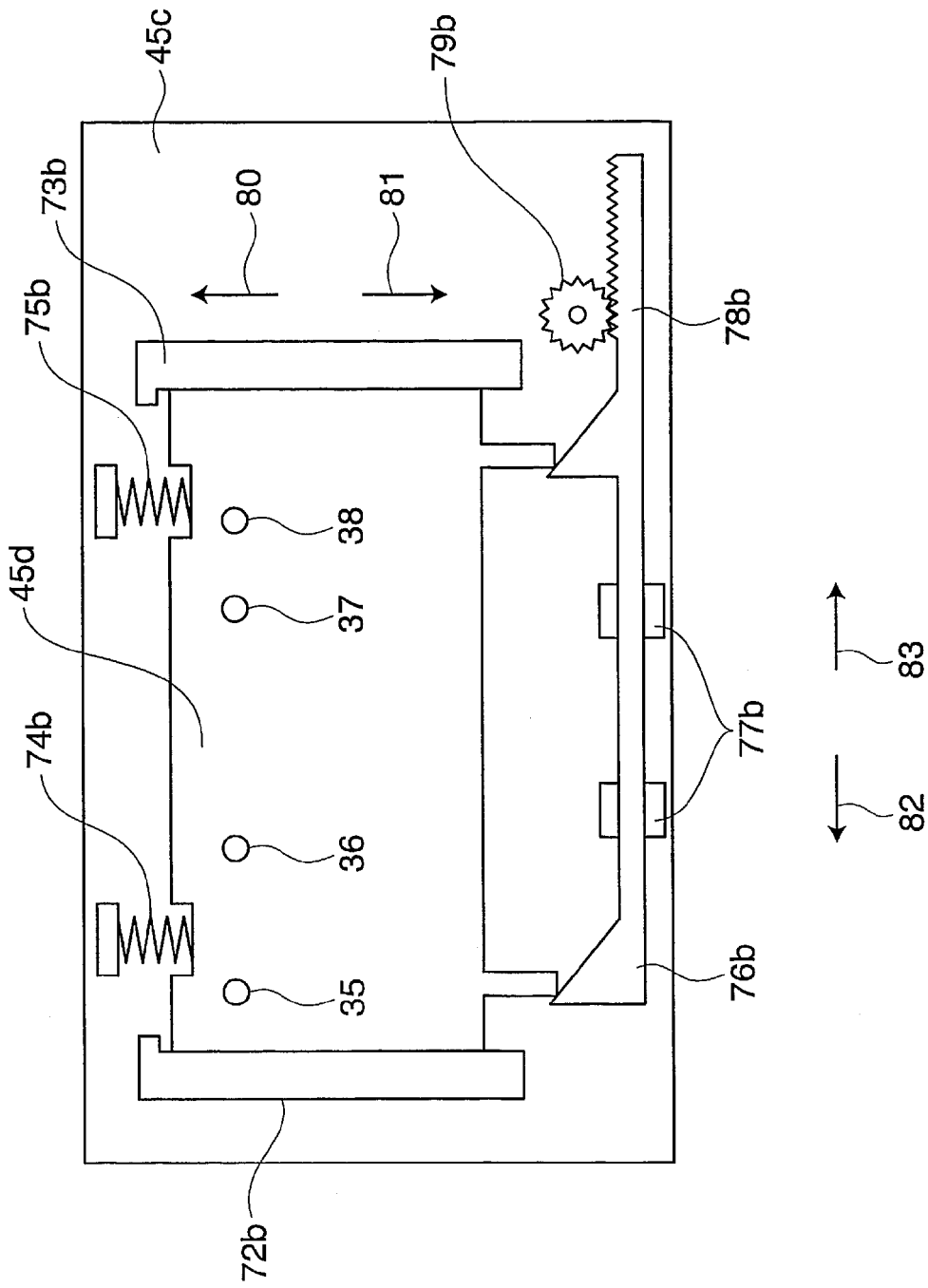
FIG. 26 is a front view illustrating another major portion according to the sixth embodiment.

FIG. 26 is a front view of the light emitting board 45c. The light emitting board 45c includes a secondary board 45d. The secondary board 45d is supported slidably in arrow directions 80, 81 by slide guides 72b, 73b, and biased in the arrow direction 81 by springs 74b, 75b. Photodiodes 35 to 38 as shown in FIG. 22 are mounted on the secondary board 45d. The secondary board 45d is connected to a cam 76b supported slidably in arrow directions 82, 83 by slide guides 77b. When a pinion 79b meshed with a rack 78b provided on the cam 76b is driven by a stepping motor 84b (FIG. 23), the secondary board 45d (i.e., the photodiodes 35 to 38) is moved in the arrow directions 80, 81.

Figure 27:
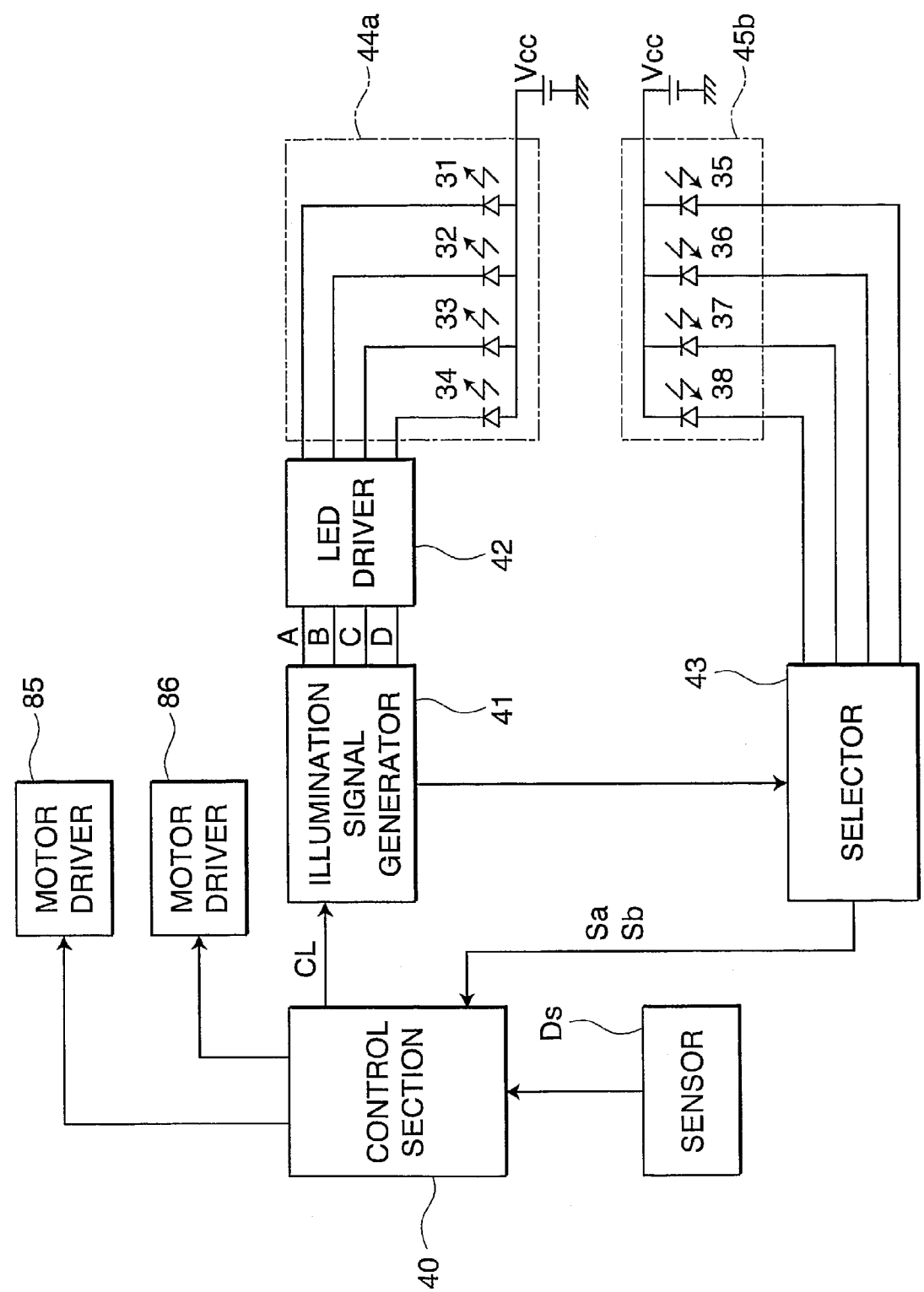
FIG. 27 is a diagram of a control circuit according to the sixth embodiment.

FIG. 27 illustrates a control circuit according to this embodiment. The circuit of FIG. 27 has substantially the same configuration as that of the fifth embodiment shown in FIG. 21, except that motor drivers 85, 86 for the stepping motors 84a, 84b are employed instead of the motor drivers 65, 66.

With this arrangement, when the operator opens the document original cover 1a as shown in FIG. 23 to place a document original and starts closing the document original cover 1a in an arrow direction 47, the control section 40 in the control circuit shown in FIG. 27 causes the motor drivers 85, 86 to drive the stepping motors 84a, 84b upon reception of an output of the sensor Ds to move the light emitting diodes 31 to 34 and the photodiodes 35 to 38 to positions as shown in FIG. 23, and causes the light emitting diodes 31 to 34 to sequentially emit light beams.

The selector 43 sequentially selects the photodiodes 35 to 38 in synchronization with the light emission of the light emitting diodes 31 to 34 to input signals Sa indicating the states (which are either a light reception state or a light non-reception state) of the photodiodes 35 to 38 to the control section 40. Then, the control section 40 drives the stepping motors 84a, 84b to move the light emitting diodes 31 to 34 and the photodiodes 35 to 38 to positions as shown in FIG. 24, and causes the light emitting diodes 31 to 34 to sequentially emit light beams. The selector 43 sequentially selects the photodiodes 35 to 38 in synchronization with the light emission of the light emitting diodes 31 to 34 to input signals Sb indicating the states (which are either a light reception state or a light non-reception state) of the photodiodes 35 to 38 to the control section 40. The control section 40 determines a document original size on the basis of the signals Sa, Sb in the same manner as in the fifth embodiment.

Seventh Embodiment

Figure 29:
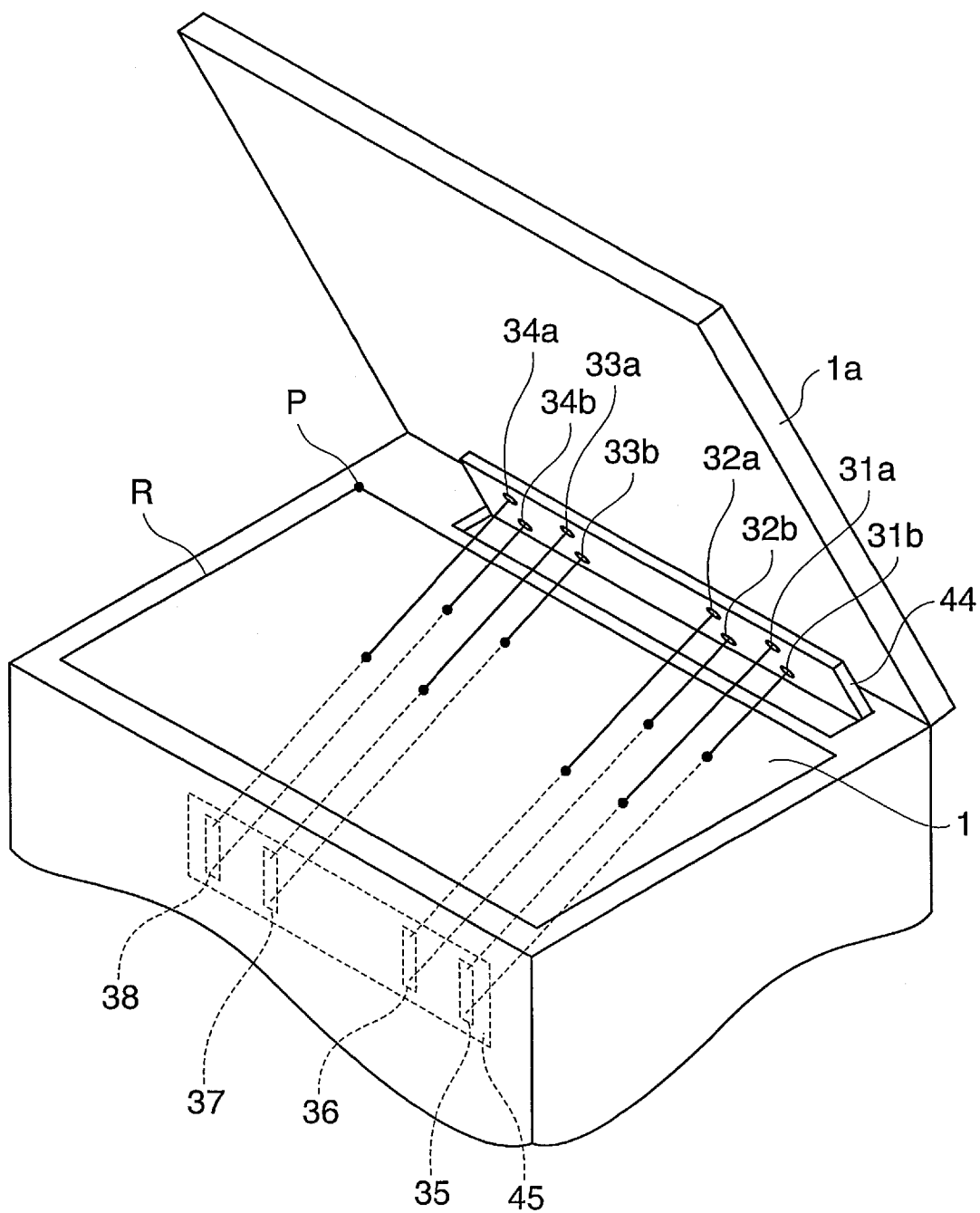
FIG. 29 is a diagram, which corresponds to FIG. 3, illustrating a seventh embodiment of the present invention.

FIG. 29 illustrates a seventh embodiment, and corresponds to FIG. 3.

A document original size detecting device according to the seventh embodiment has substantially the same construction as that of the first embodiment, except that photodiodes 35 to 38 are employed instead of the photodiode pairs 35a, 35b; 36a, 36b; 37a, 37b; and 38a, 38b, and the photodiodes 35 to 38 each have an elongated light receiving portion capable of receiving light beams emitted from the corresponding light emitting diode pair 31a, 31b; 32a, 32b; 33a, 33b; 34a, 34b disposed in opposed relation thereto.

Figure 30:
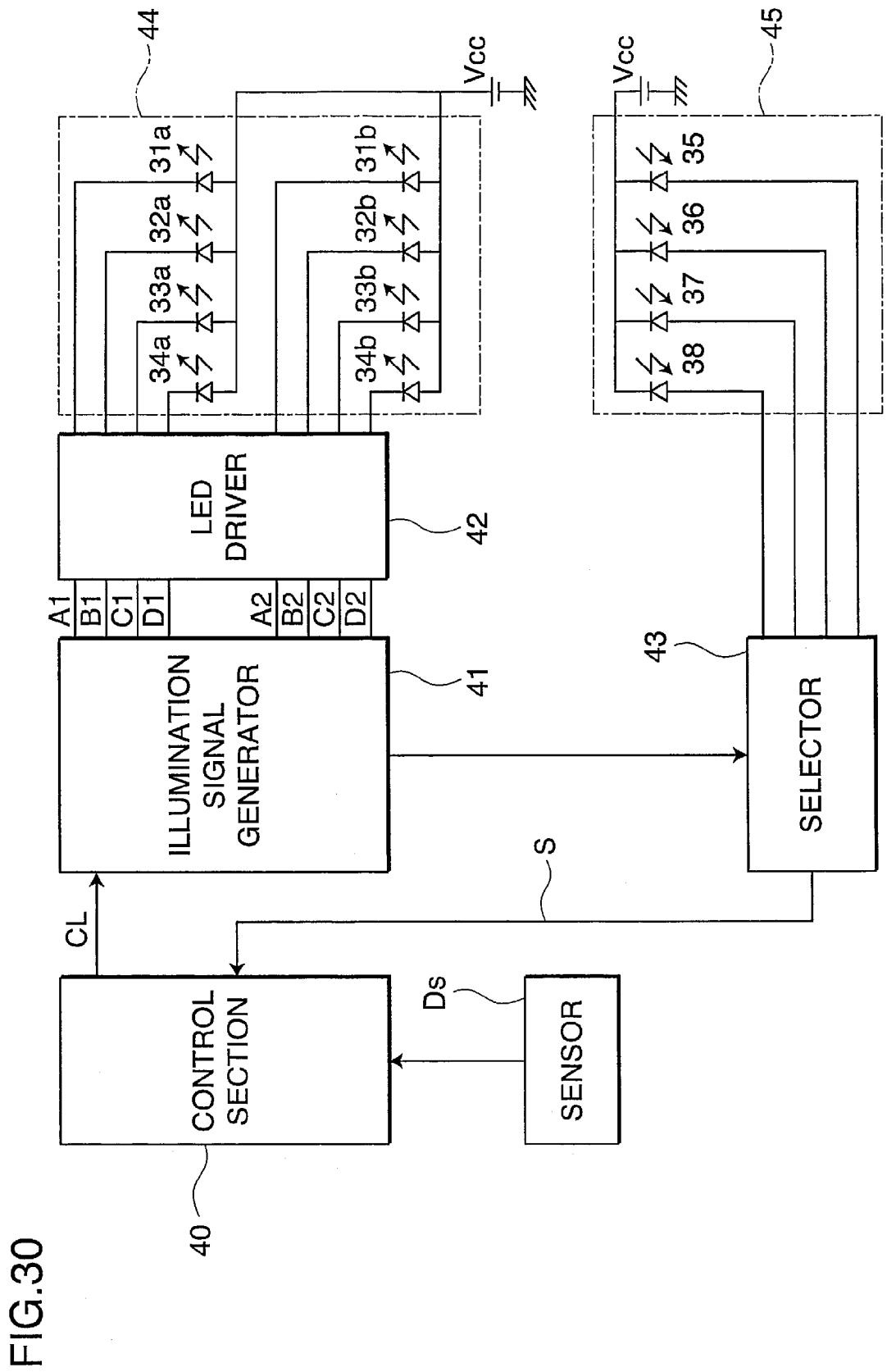
FIG. 30 is a diagram, which corresponds to FIG. 5, illustrating the seventh embodiment.
Figure 31:
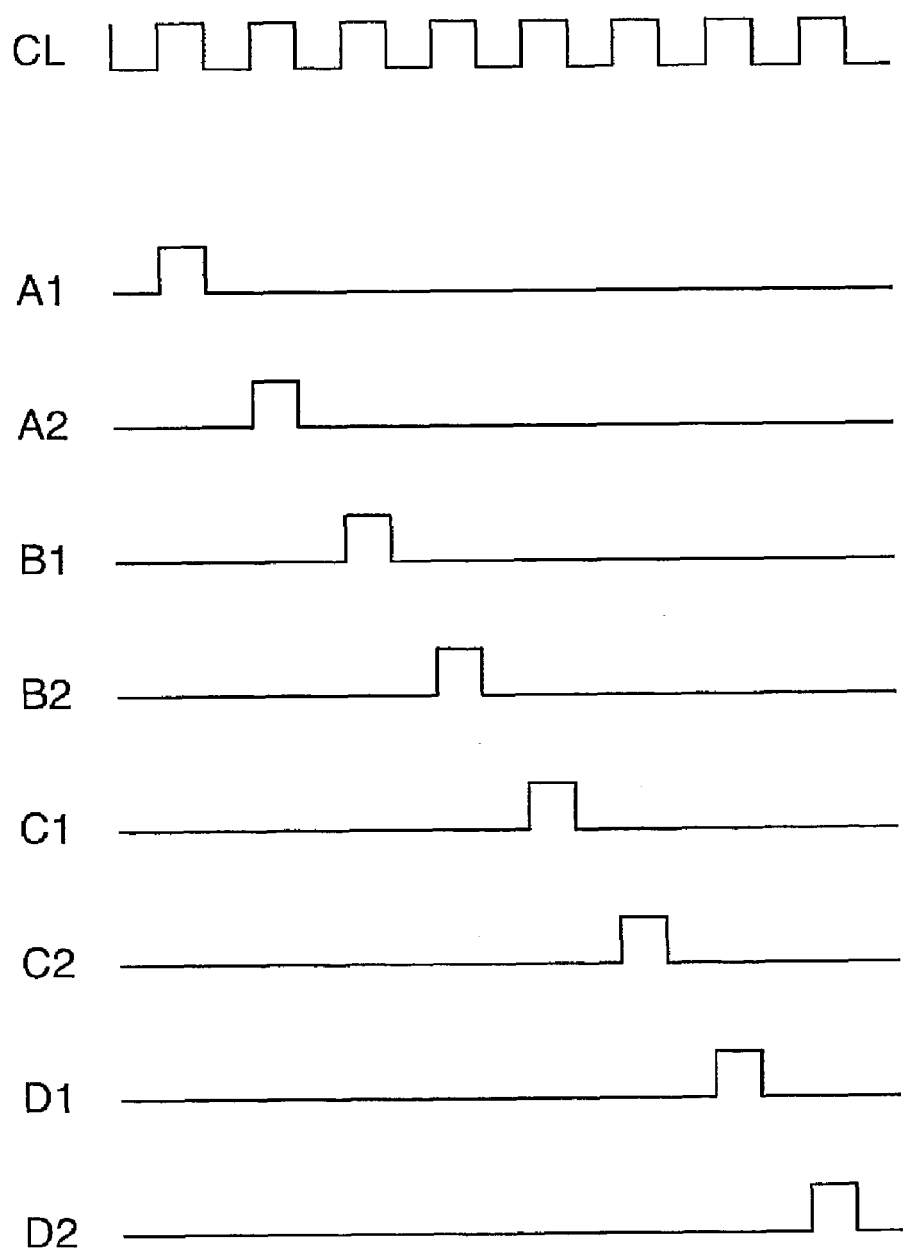
FIG. 31 is a diagram, which corresponds to FIG. 6, illustrating the seventh embodiment.

FIG. 30 is a diagram of a control circuit according to the seventh embodiment, and FIG. 31 is a signal waveform diagram. With reference to these figures, an operation to be performed by the document original size detecting device according to this embodiment will be described.

In FIG. 30, a control section 40 includes a microprocessor including a CPU, a ROM and a RAM as in the first embodiment. As in the first embodiment (see FIG. 4), a sensor Ds shown in FIG. 30 corresponds to the sensor 70 which outputs a signal when the document original cover 1a is opened in the arrow direction 48 to the maximum angle.

When the operator starts closing the document original cover 1a, the control section 40 generates a clock signal CL as shown in FIG. 31 upon reception of the signal outputted from the sensor Ds, and outputs the clock signal CL to an illumination signal generator 41.

The illumination signal generator 41 sequentially generates illumination signals A1, A2, B1, B2, C1, C2, D1, D2 as shown in FIG. 31 on the basis of the clock signal CL, and outputs these signals to an LED driver 42 and a selector 43. The LED driver 42 sequentially applies an electric current to the light emitting diodes 31a, 31b, 32a, 32b, 33a, 33b, 34a, 34b from a power source Vcc in synchronization with the illumination signals A1, A2, B1, B2, C1, C2, D1, D2 to cause these light emitting diodes to emit light beams. The selector 43 selectively detects the states (which are either a light reception state or a light non-reception state) of the photodiodes 35 to 38 each connected to a power source Vcc in synchronization with the illumination signals A1, A2, B1, B2, C1, C2, D1, D2, and inputs signals S indicating the results of the detection to the control section 40. Based on the signals S, the control section 40 determines a document original size.

That is, if the light beams emitted from each of the light emitting diode pairs are both received by the corresponding single photodiode, the selector 43 outputs a light reception signal. At this time, the control section 40 judges that the photodiode is in a light unblocked state, which means that the light beams are not blocked by the document original.

If none or either of the light beams is received, the selector 43 outputs no light reception signal. Thus, the control section 40 judges that the photodiode is in a light blocked state, which means that at least one of the light beams is blocked by the document original. For example, if the light beams emitted from the paired light emitting diodes 31a, 31b are both received by the photodiode 35, the selector 43 outputs the light reception signal, and the control section 40 judges that the photodiode 35 is in the light unblocked state. If none or either of the light beams emitted from the light emitting diodes 31a, 31b is received by the photodiode 35, the control section judges that the photodiode 35 is in the light blocked state.

What is claimed is:

1. A document original size detecting device comprising:

a plurality of sensors each including a light emitting portion and a light receiving portion and respectively disposed as corresponding to different sizes of document originals to be placed on a transparent document platen, the light emitting portion and the light receiving portion being positioned above and below the transparent document platen, respectively; and a detecting section which determines a document original size based on outputs of the sensors;

wherein the light emitting portion of each of the sensors emits light to illuminate at least two positions on a document placing region of the document platen on which a document original to be subjected to size detection is placed, and the detecting section determines the document original size based on whether or not the light receiving portion of each of the sensors detects the document original blocking the light in at least one of the two positions, and wherein the light emitting portion of each of the sensors includes at least two light emitting elements, and the light receiving portion of each of the sensors includes at least one light receiving element which receives light beams emitted from the light emitting elements.

2. A document original size detecting device as set forth in claim 1, wherein the light emitting elements of each of the sensors are arranged so that the at least two positions on the document placing region are aligned parallel to a reference line along which one edge of the document original is positioned on the document platen.

3. A document original size detecting device as set forth in claim 2, wherein a distance L between the at least two positions is defined by the following expression:

$$na+(n-1)b<L<na+nb$$

wherein "a" is a diameter of each of punch holes formed in the document original, "b" is a distance between each adjacent pair of punch holes, and "n" is a given natural number.

4. A document original size detecting device comprising:

a plurality of sensors each including a light emitting portion and a light receiving portion and respectively disposed as corresponding to different sizes of document originals to be placed on a transparent document platen, the light emitting portion and the light receiving portion being positioned above and below the transparent document platen, respectively; and a detecting section which determines a document original size based on outputs of the sensors;

wherein the light emitting portion of each of the sensors emits light to illuminate at least two positions on a document placing region of the document platen on which a document original to be subjected to size detection is placed, and the detecting section determines the document original size based on whether or not the light receiving portion of each of the sensors detects the document original blocking the light in at least one of the two positions, wherein the light emitting portion of each of the sensors includes a light emitting element which emits a light beam on the document platen, and an illumination position moving section which moves an illumination position at which the light beam emitted from the light emitting element is incident on the document platen to the at least two positions, the at least two positions being aligned parallel to a reference line along which one edge of the document original is positioned on the document platen, and wherein the light receiving portion of each of the sensors includes a light receiving element which receives the light beam emitted from the light emitting element.

5. A document original size detecting device as set forth in claim 4, wherein the illumination position moving section includes a movement mechanism which moves the light emitting element by a spring member.

6. A document original size detecting device as set forth in claim 4, wherein the illumination position moving section includes a mirror which reflects the light beam emitted from the light emitting element, and a movement mechanism which moves the mirror by a spring member.

7. A document original size detecting device as set forth in claim 4, wherein the illumination position moving section includes a mirror which reflects a light beam emitted from the light emitting element, and a movement mechanism which moves the mirror by driving means.

8. A document original size detecting device comprising:

a plurality of sensors each including a light emitting portion and a light receiving portion and respectively disposed as corresponding to different sizes of document originals to be placed on a transparent document platen, the light emitting portion and the light receiving portion being positioned above and below the transparent document platen, respectively; and a detecting section which determines a document original size based on outputs of the sensors;

wherein the light emitting portion of each of the sensors emits light to illuminate at least two positions on a document placing region of the document platen on which a document original to be subjected to size detection is placed, and the detecting section determines the document original size based on whether or not the light receiving portion of each of the sensors detects the document original blocking the light in at least one of the two positions, wherein the light emitting portion of each of the sensors includes a light emitting element and an illumination position moving section which moves an illumination position at which a light beam emitted from the light emitting element is incident on the document platen to the at least two positions, the at least two positions being aligned parallel to a reference line along which one edge of the document original is positioned on the document platen, and wherein the light receiving portion of each of the sensors includes a light receiving element and a light receiving element moving section which moves the light receiving element according to movement of the illumination position on the document platen.

9. A document original size detecting device as set forth in claim 8, wherein the illumination position moving section includes a first movement mechanism which moves the light emitting element by driving means, and the light receiving element moving section includes a second movement mechanism which moves the light receiving element by driving means.

10. A document original size detecting device as set forth in claim 8, wherein the illumination position moving section includes a first board mounted with the light emitting element and a first movement mechanism which moves the first board by driving means, wherein the light receiving element moving section includes a second board mounted with the light receiving element and a second movement mechanism which moves the second board by driving means.

* * * * *